(12) United States Patent
Yashiro et al.

(10) Patent No.: US 9,535,548 B2
(45) Date of Patent: Jan. 3, 2017

(54) DISPLAY DEVICE

(71) Applicant: Sharp Kabushiki Kaisha, Osaka-shi, Osaka (JP)

(72) Inventors: Yuhji Yashiro, Osaka (JP); Kazutoshi Kida, Osaka (JP); Hiromi Katoh, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days.

(21) Appl. No.: 14/403,287

(22) PCT Filed: Apr. 22, 2013

(86) PCT No.: PCT/JP2013/061788
§ 371 (c)(1),
(2) Date: Nov. 24, 2014

(87) PCT Pub. No.: WO2013/179813
PCT Pub. Date: Dec. 5, 2013

(65) Prior Publication Data
US 2015/0185907 A1    Jul. 2, 2015

(30) Foreign Application Priority Data
May 31, 2012    (JP) ................................ 2012-125459

(51) Int. Cl.
*G06F 3/044*    (2006.01)
*G02B 1/14*    (2015.01)
(Continued)

(52) U.S. Cl.
CPC ................. *G06F 3/044* (2013.01); *G02B 1/08* (2013.01); *G02B 1/11* (2013.01); *G02B 1/118* (2013.01);
(Continued)

(58) Field of Classification Search
None
See application file for complete search history.

(56) References Cited

U.S. PATENT DOCUMENTS

2005/0237307 A1* 10/2005 Hieda ..................... G06F 3/041
345/173
2009/0061150 A1    3/2009 Noguchi et al.
2010/0182689 A1*  7/2010 Nakanishi .......... C08G 18/0823
359/485.01

FOREIGN PATENT DOCUMENTS

CN    101377554 A    3/2009
JP    2008-83491 A    4/2008
(Continued)

OTHER PUBLICATIONS

Official Communication issued in International Patent Application No. PCT/JP2013/061788, mailed on Jun. 18, 2013.

*Primary Examiner* — Kenneth B Lee, Jr.
(74) *Attorney, Agent, or Firm* — Keating & Bennett, LLP

(57) ABSTRACT

A display device (1) includes (i) a display panel (12) including a polarizing plate (18) on a surface of the display panel (12) and (ii) a touch panel (20) including a birefringent base material (31) on which a Y electrode pattern (32) and an X electrode pattern (33) are provided. Polarized light which has exited from the polarizing plate (18) enters the birefringent base material (31). The display device (1) includes an antireflection layer (28) which reduces reflection of the polarized light. The antireflection layer (28) is provided on a first surface of the touch panel (20) which first surface is opposite to a second surface of the touch panel (20) which second surface faces the display panel (12).

17 Claims, 22 Drawing Sheets

(51) Int. Cl.
*G02B 1/08* (2006.01)
*G02B 1/11* (2015.01)
*G02B 1/118* (2015.01)
*G02B 5/30* (2006.01)
*G02F 1/1333* (2006.01)
*G02F 1/1335* (2006.01)
*G02F 1/13363* (2006.01)

(52) U.S. Cl.
CPC ............... *G02B 1/14* (2015.01); *G02B 5/3025* (2013.01); *G02B 5/3083* (2013.01); *G02F 1/13338* (2013.01); *G02F 1/13363* (2013.01); *G02F 1/133502* (2013.01); *G02F 1/133528* (2013.01); *G02F 2001/133635* (2013.01)

(56) References Cited

FOREIGN PATENT DOCUMENTS

| JP | 2008-191544 A | 8/2008 |
| JP | 2009-169837 A | 7/2009 |
| JP | 2010-122599 A | 6/2010 |
| JP | 2012-027622 A | 2/2012 |
| JP | 2012-230491 A | 11/2012 |

\* cited by examiner

F I G. 6
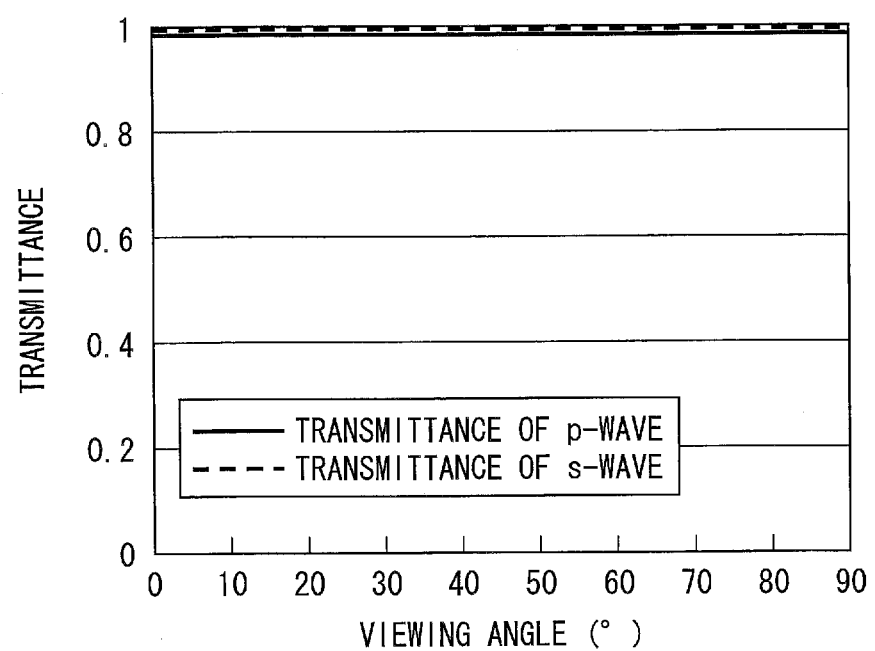

F I G. 8
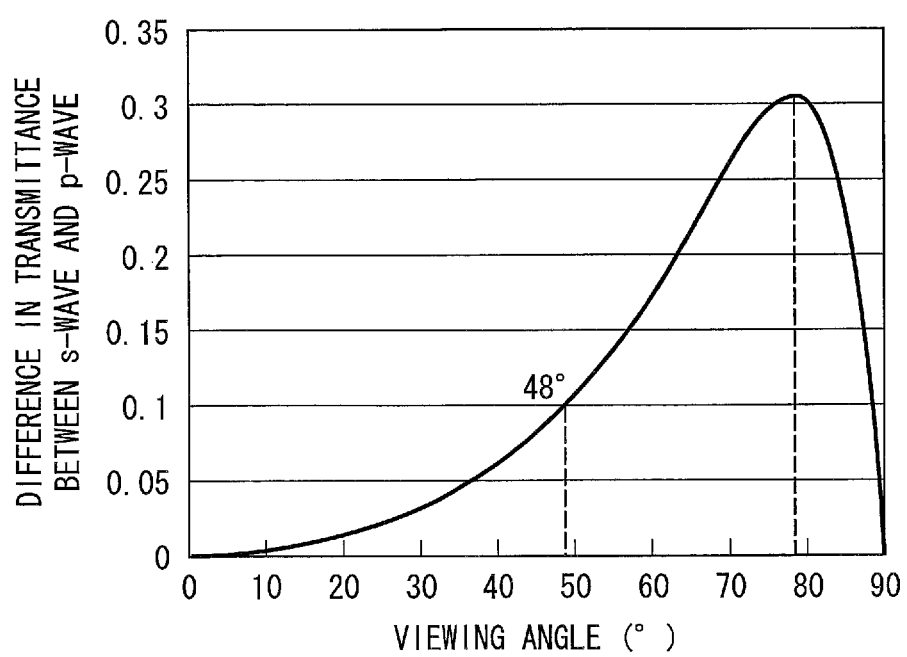

F I G. 1 0
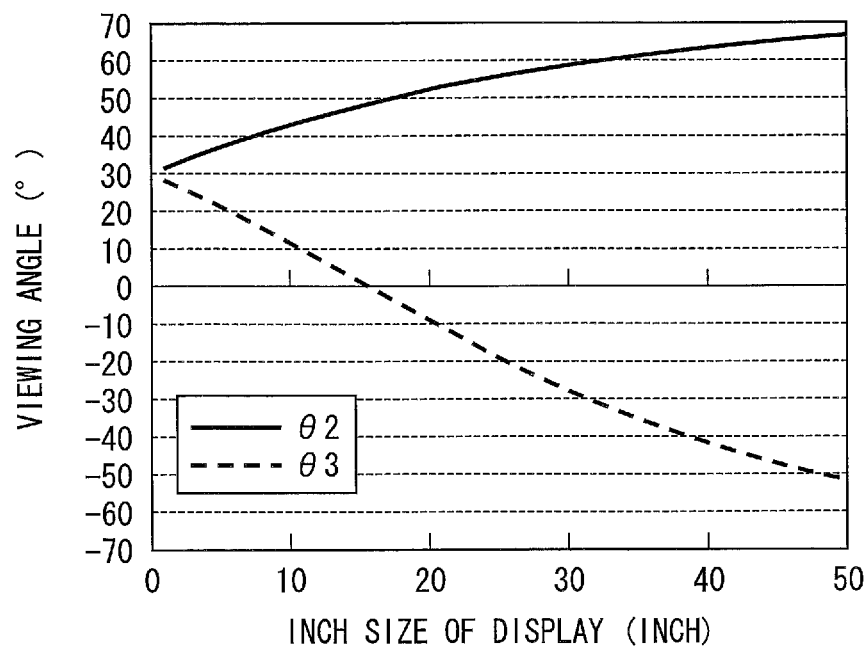

F I G. 1 2
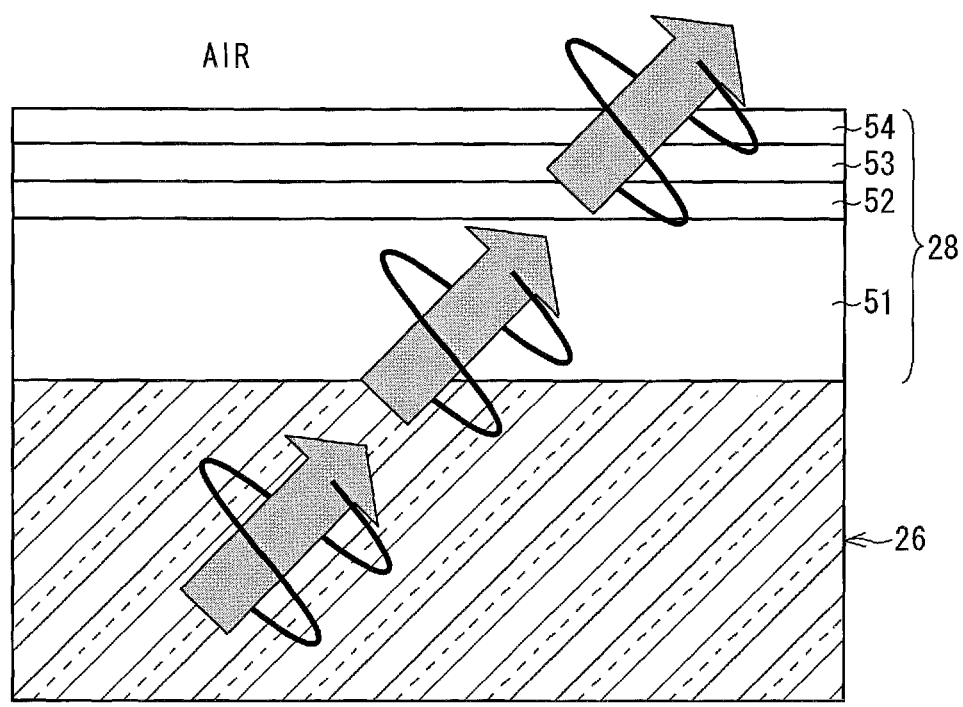

F I G. 2 1
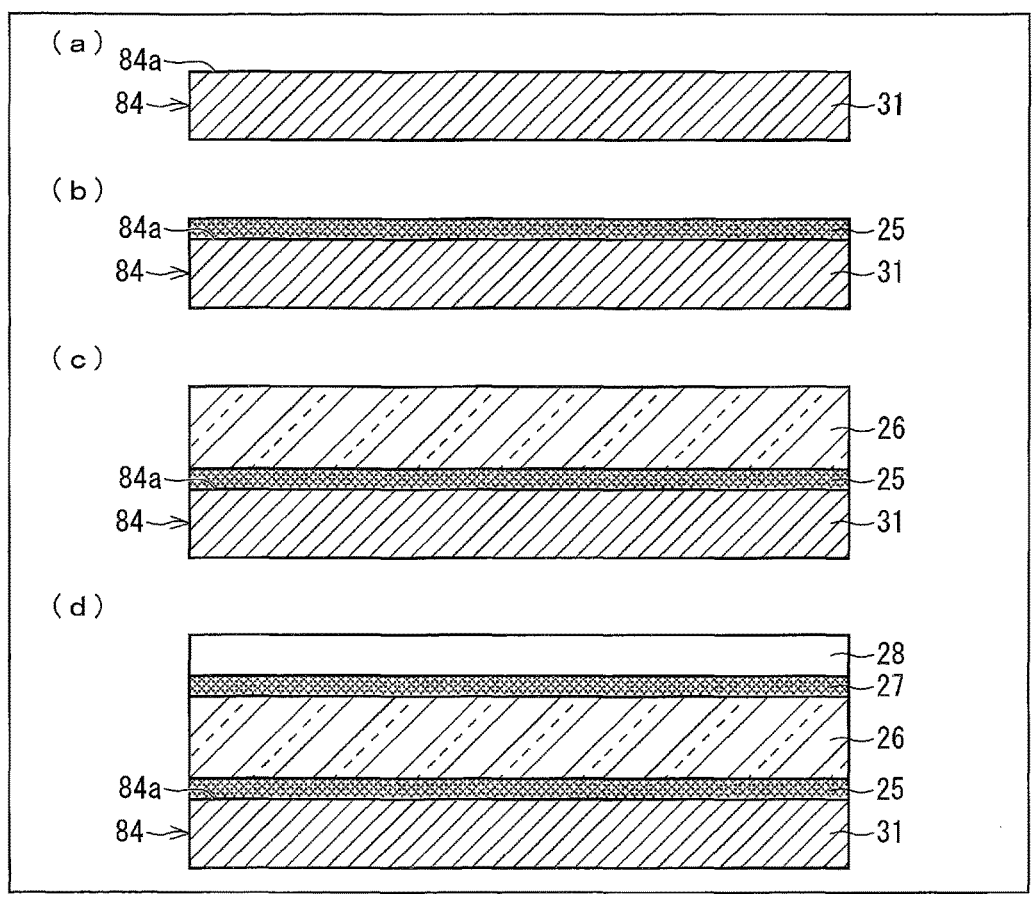

DISPLAY DEVICE

TECHNICAL FIELD

The present invention relates to a display device provided with a touch panel that includes a birefringent base material which touch panel polarized light enters, the polarized light having exited from a display panel (e.g., a liquid crystal panel) that includes a polarizing plate on a surface of the display panel.

BACKGROUND ART

As a touch panel conventionally known is an electrostatic capacitive touch panel which detects a contact position at which a detecting object, such as a finger or a pen for use in input, comes into contact with a display screen, by detecting a change in electrostatic capacitance caused by the contact.

In terms of cost, heat resistance, etc., a polyethylene terephthalate (PET) film etc. is conventionally and typically employed as a base material of a touch sensor of the touch panel (see, for example, Patent Literatures 1 and 2).

However, in a case where an observer who is wearing polarized glasses observes a liquid crystal display device on which front surface a touch panel that includes a birefringent base material such as the PET film is provided, the observer visually recognizes rainbow unevenness (see, for example, Patent Literatures 1 and 2).

Patent Literature 1 discloses eliminating rainbow unevenness which is visually recognized by a viewer with polarized glasses on when the viewer views a liquid crystal display device provided with an electrostatic capacitive touch sensor, by making an optical compensation with use of a ¼ wavelength plate that is provided between the electrostatic capacitive touch sensor and the liquid crystal display device, the rainbow unevenness being caused by beams of light passing through the polarized glasses to be combined with each other which beams of light have passed through the electrostatic capacitive touch sensor to make a phase difference.

Patent Literature 2 discloses eliminating rainbow unevenness which is visually recognized by a viewer with polarized glasses on when the viewer views a resistive film touch panel with which a liquid crystal display device is provided, by (i) providing a ¼ wavelength plate between the liquid crystal display device and (a) a first surface of an upper electrode plate which first surface is opposite to a second surface of the upper electrode plate on which second surface a transparent electrically-conductive film is provided or (b) a first surface of a lower electrode plate which first surface is opposite to a second surface of the lower electrode plate on which second surface a transparent electrically-conductive film is provided, and (ii) converting, into circularly-polarized light, linearly-polarized light emitted from the liquid crystal display device.

Patent Literature 2 further discloses absorbing, by use of a circular polarization plate in which a ¼ wavelength plate and a polarizing plate are combined, light which has externally entered and has been internally reflected.

CITATION LIST

Patent Literatures

Patent Literature 1
Japanese Patent Application Publication, Tokukai, No. 2012-27622 (Publication Date: Feb. 9, 2012)
Patent Literature 2
Japanese Patent Application Publication, Tokukai, No. 2009-169837 (Publication Date: Jul. 30, 2009)
Patent Literature 3
Japanese Patent Application Publication, Tokukai, No. 2008-191544 (Publication Date: Aug. 21, 2008)
Patent Literature 4
Japanese Patent Application Publication, Tokukai, No. 2010-122599 (Publication Date: Jun. 3, 2010)

SUMMARY OF INVENTION

Technical Problem

However, Patent Literatures 1 and 2 disclose eliminating rainbow unevenness which is visually recognized by a viewer only when the viewer views, with polarized glasses on, a liquid crystal display device with which a touch panel is provided.

As such, it is known that rainbow unevenness is visually recognized by a viewer when the viewer views, with polarized glasses on, a liquid crystal display device with which a touch panel is provided. It is, however, unknown that rainbow unevenness is visually recognized by a viewer without polarized glasses on when the viewer views, at a certain viewing angle, a liquid crystal display device with which a touch panel is provided.

Conventionally, a large-sized touch panel includes a glass sensor that includes a glass base material. Even if such a touch panel is provided on a front surface of a display device such as a liquid crystal display device, no rainbow unevenness occurs.

Rainbow unevenness is neither visually recognized in a case where a display device provided with a small-sized touch panel (e.g., a mobile phone) is normally used, for example, in a case where the display device is viewed from the front of a screen while being held by a hand as it is normally used.

However, inventors of the present invention found that, in a case where a touch panel in which a birefringent base material such as a PET film is employed as a base material is provided on a display panel (e.g., a liquid crystal panel) from which polarized light exits, rainbow unevenness occurs at a certain viewing angle. The inventors also found that, for example, in a case where a large-sized touch panel which is horizontally placed is viewed from an oblique direction, rainbow unevenness is constantly observed, and even in a case where a small-sized touch panel is used, rainbow unevenness is visually recognized depending on a viewing angle.

The inventors of the present invention further found that, in a case where a touch panel including a birefringent base material (e.g., a PET film) which causes a phase shift of linearly-polarized light which has entered the birefringent base material is provided on a main body of a display device (such as a liquid crystal panel) from which polarized light exits, rainbow unevenness is visually recognized at a certain viewing angle even by a viewer without polarized glasses on due to (i) a change in polarization state differing from one wavelength from another which change is caused by the birefringent base material and (ii) a polarization effect of interface reflection on an interface with an air layer.

The inventors of the present invention further found that, even if polarized light which exits from a display panel such as a liquid crystal panel is converted into circularly-polarized light (as disclosed in Patent Literatures 1 and 2), the circularly-polarized light is linearly polarized due to interface reflection on an interface between a birefringent base material and a layer which is adjacent to the birefringent base material and made from a material different from that for the birefringent base material, and therefore, such rainbow unevenness is not eliminated.

The present invention was made to attain a novel object, found by the inventors of the present invention, of eliminating rainbow unevenness generated due to (i) a change in polarization state of polarized light which exits from a main body of a display device and (ii) a polarization effect of interface reflection on an interface between an air layer and a touch panel that includes a birefringent base material which touch panel is provided on a front surface of the main body of the display device.

Solution to Problem

In order to attain the object, a display device of an aspect of the present invention is configured to be a display device, including: a display panel including a polarizing plate on a surface of the display panel; and a touch panel including a birefringent base material on which electrodes for detecting a touch position of a position detecting object are provided, polarized light which has exited from the polarizing plate entering the birefringent base material, and the touch panel having a first surface on which an antireflection layer which reduces reflection of the polarized light is provided, the first surface being opposite to a second surface of the touch panel which second surface faces the display panel.

Advantageous Effects of Invention

Rainbow unevenness, which occurs in a case where the touch panel is provided on the display panel, is caused due to (i) a change in polarization state that differs from one wavelength to another, the change being caused due to the birefringent base material, and (ii) a dependency, on the polarization state, of interface reflection on an interface between an air layer and a surface of the touch panel, e.g., a cover glass. Specifically, a phase shift of linearly-polarized light due to a birefringent property of the birefringent base material, and a polarization effect generate the rainbow unevenness.

It is, however, possible to prevent transmitted light from being colored, and to reduce rainbow unevenness to be visually recognized at a viewing angle at which rainbow unevenness is conventionally visually recognized, by providing the antireflection layer on an interface between the display device and air, i.e., on the first surface of the touch panel which first surface is opposite to the second surface of the touch panel which second surface faces the display panel so as to reduce reflection of not external light but a polarizing plate which has exited from the display panel and has passed through the birefringent base material (as has been described).

Figure 2:
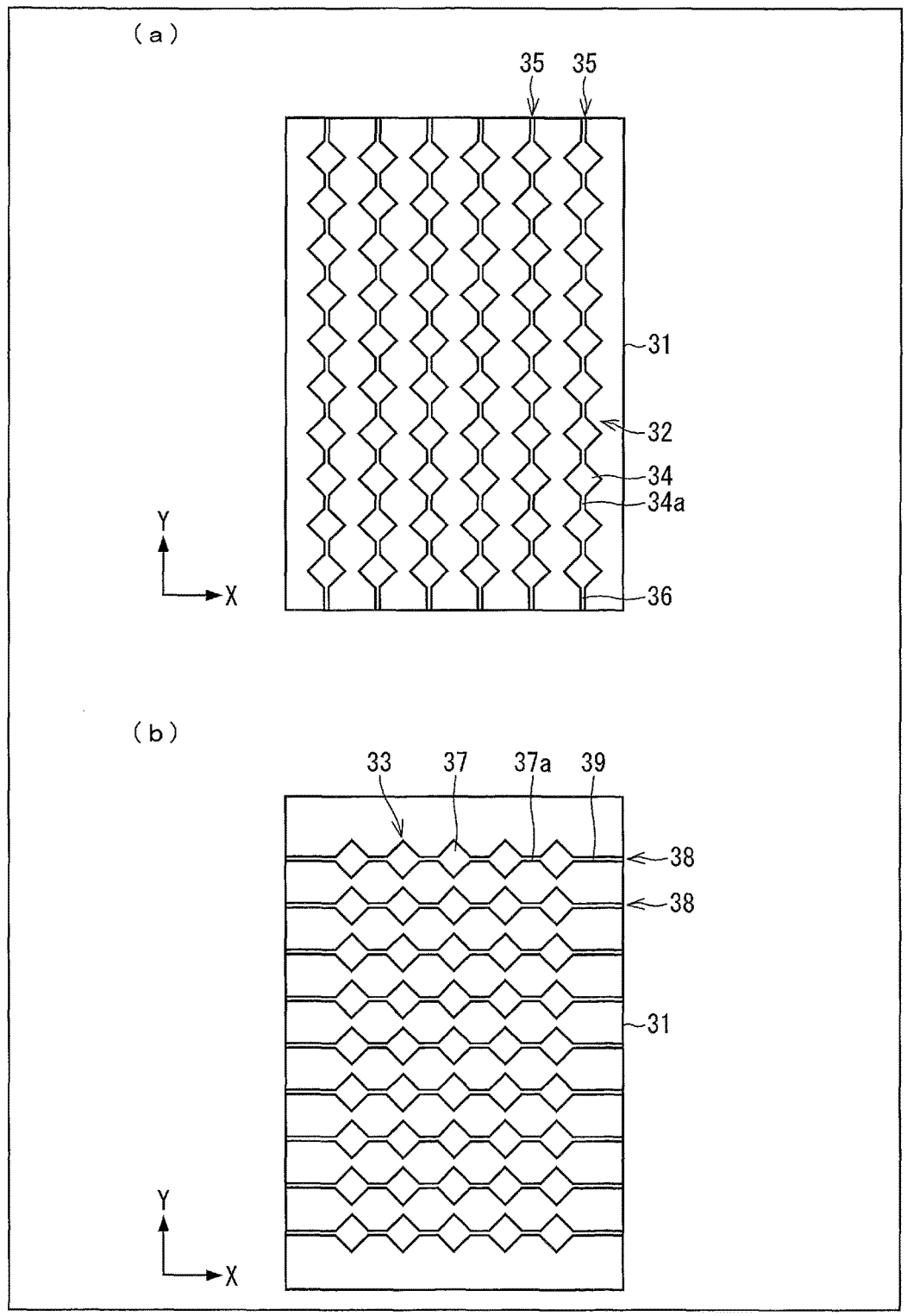

(a) of FIG. 2 is a plain view illustrating a pattern shape of a Y electrode pattern of a touch panel provided in the display device of the embodiment of the present invention. (b) of FIG. 2 is a plain view illustrating a pattern shape of an X electrode pattern of the touch panel.

Figure 3:
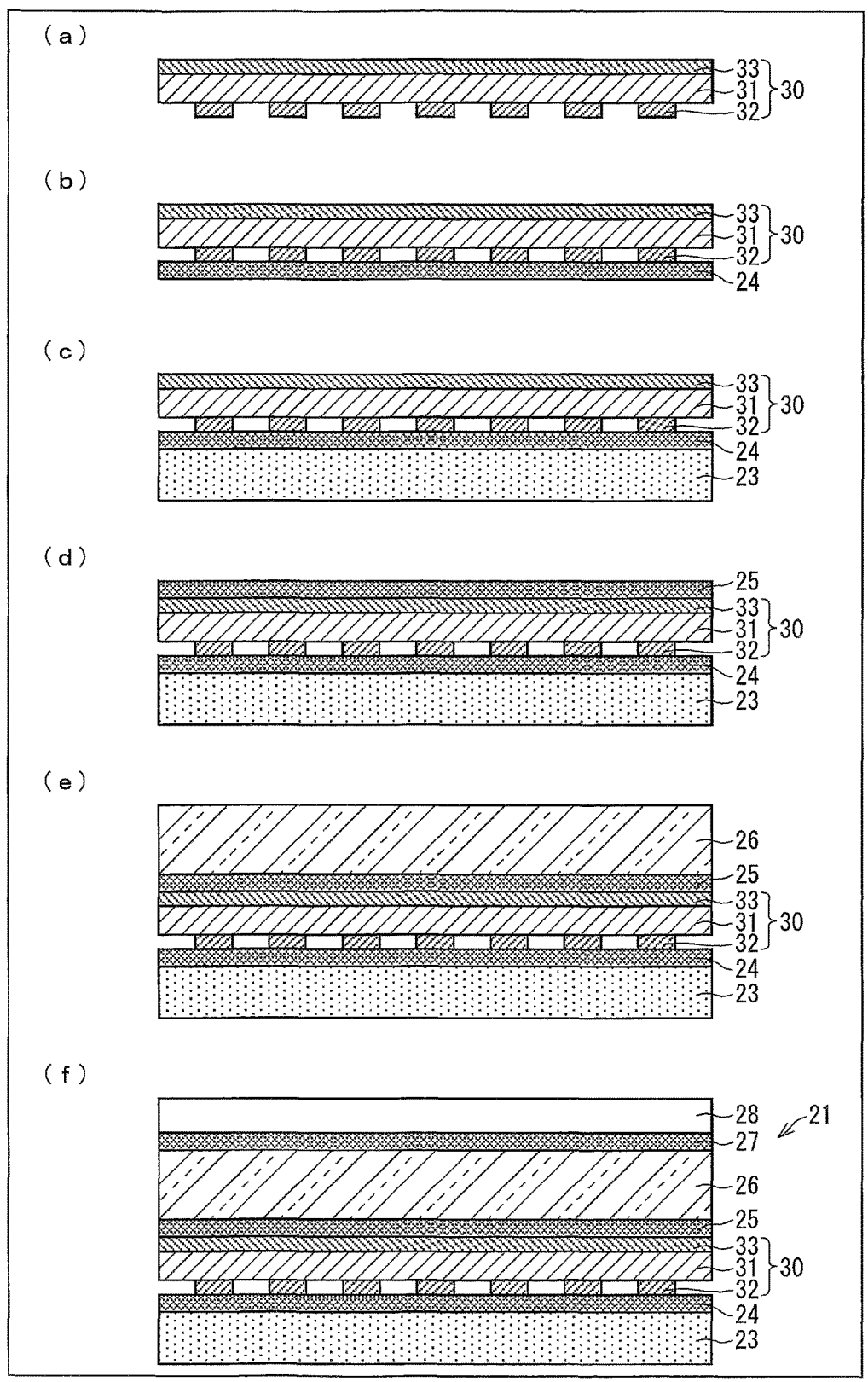

(a) of FIG. 3 through (f) of FIG. 3 are cross-sectional views illustrating, in order of step, a method of producing a first sensor body of the touch panel.

Figure 4:
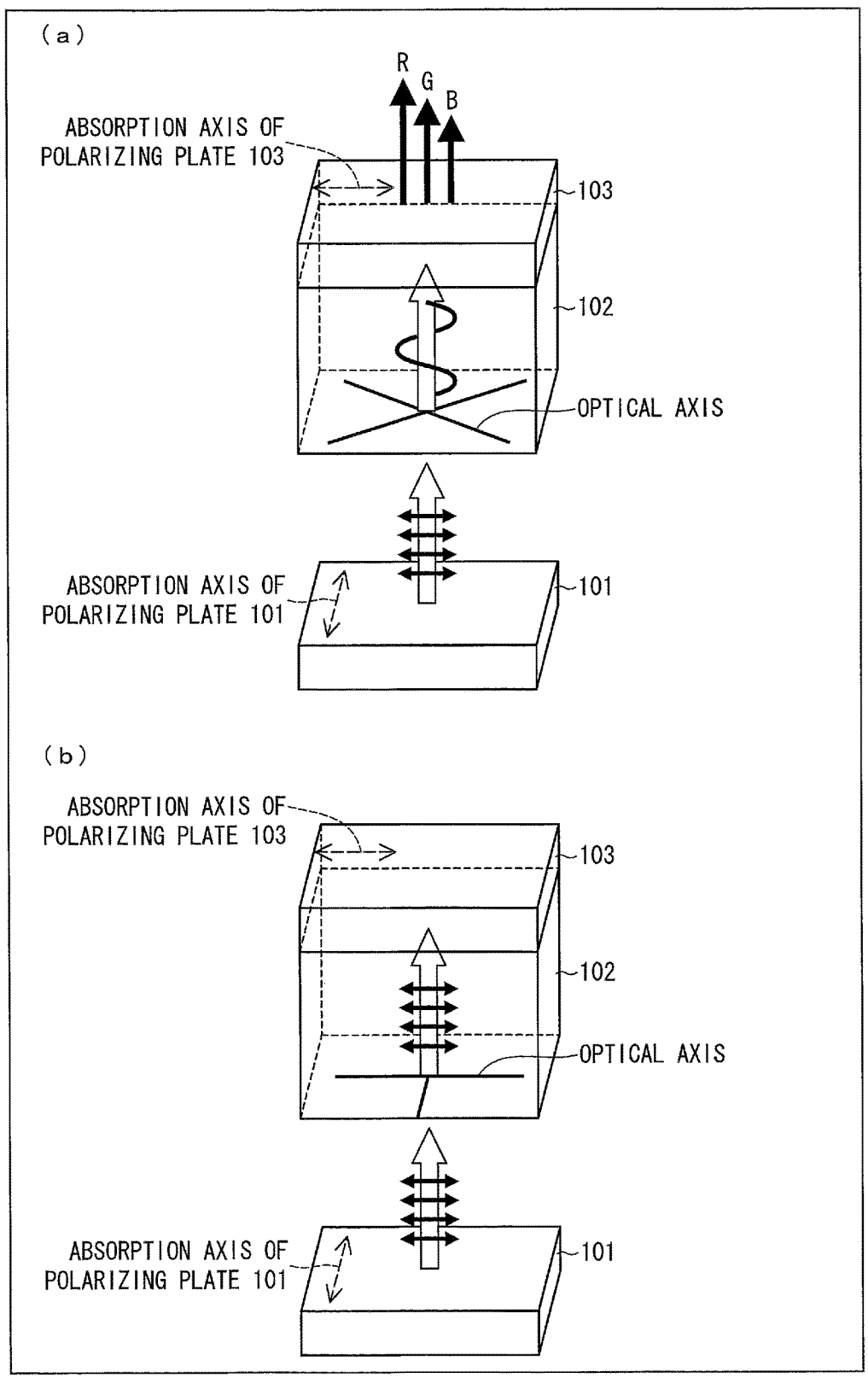

(a) of FIG. 4 and (b) of FIG. 4 are exploded perspective views each schematically illustrating polarized light obtained in a case where a birefringent film base material is sandwiched between a polarizing plate provided on an upper surface side of a liquid crystal panel and a polarizing plate provided on an upper surface side of the birefringent film base material.

Figure 5:
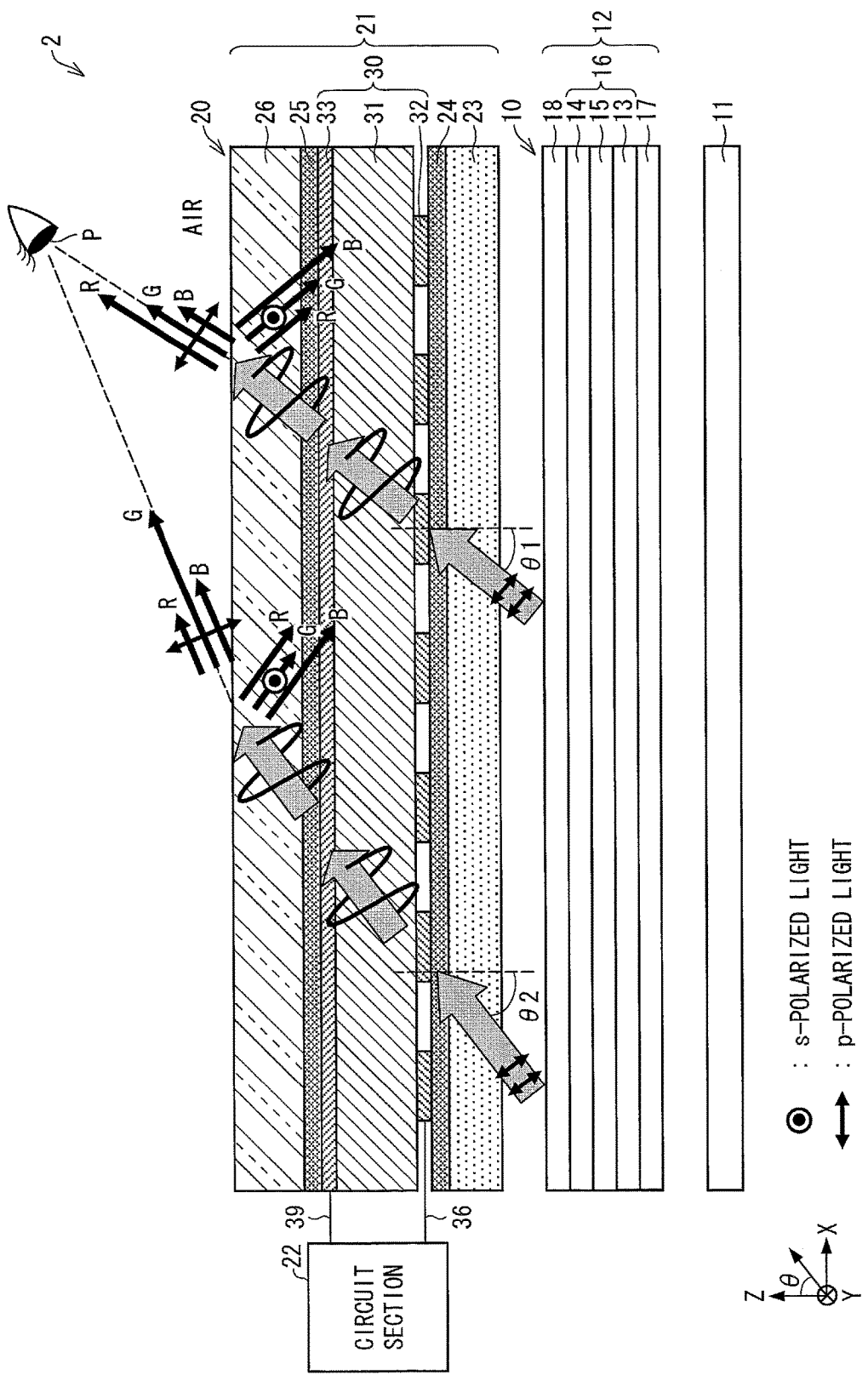

FIG. 5 is an exploded cross-sectional view schematically illustrating a rainbow unevenness generation mechanism.

FIG. 6 is a graph illustrating (i) a relation between a viewing angle and each of a transmittance of an s-wave and a transmittance of a p-wave on an interface between an OCAT (Optical Clear Adhesive Tape) and a PET film, and (ii) a relation between the viewing angle and each of a transmittance of an s-wave and a transmittance of a p-wave on an interface between a glass and the OCAT.

Figure 7:
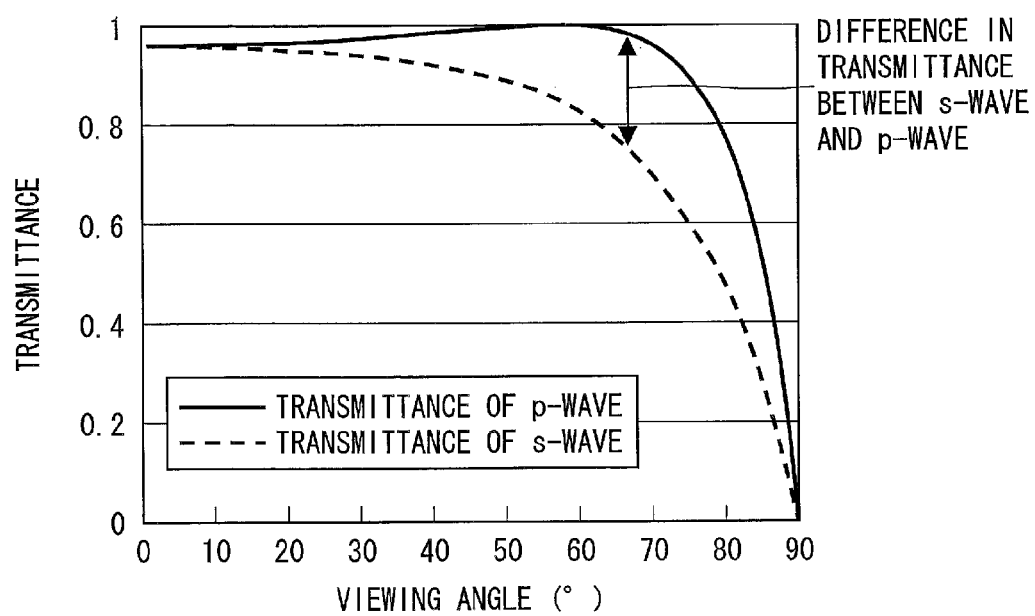

FIG. 7 is a graph illustrating a relation between a viewing angle and each of a transmittance of an s-wave and a transmittance of a p-wave on an interface between the glass and an air layer.

FIG. 8 is a graph illustrating a relation between a viewing angle and a difference in transmittance between a p-wave and an s-wave.

Figure 9:
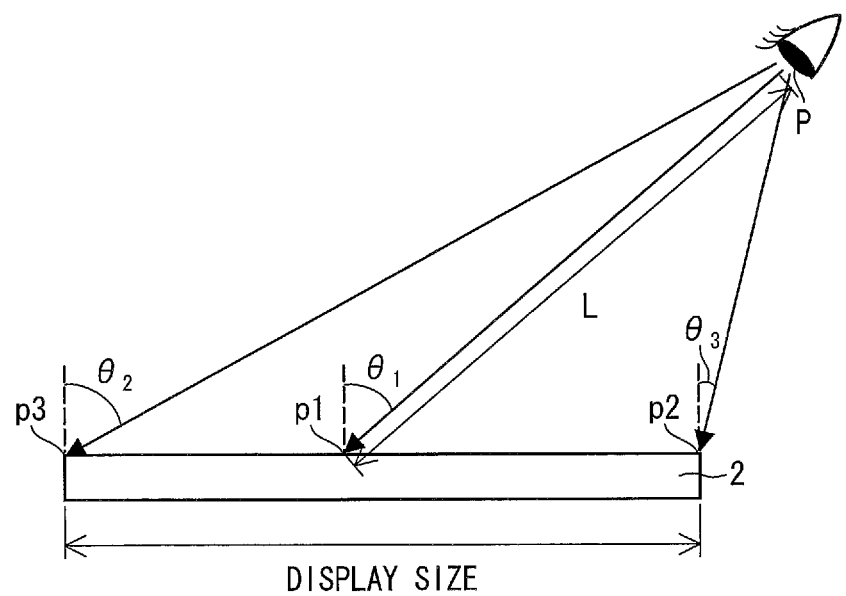

FIG. 9 is a view illustrating a relation between (i) a display size of a display device configured as illustrated in FIG. 5 and (ii) viewing angles $\theta_1$ through $\theta_3$ and a viewing distance L.

FIG. 10 is a graph illustrating a viewing angle range for each display size in a case where the viewing distance L is 40 cm and a central viewing angle $\theta_1$ is 30°.

Figure 11:
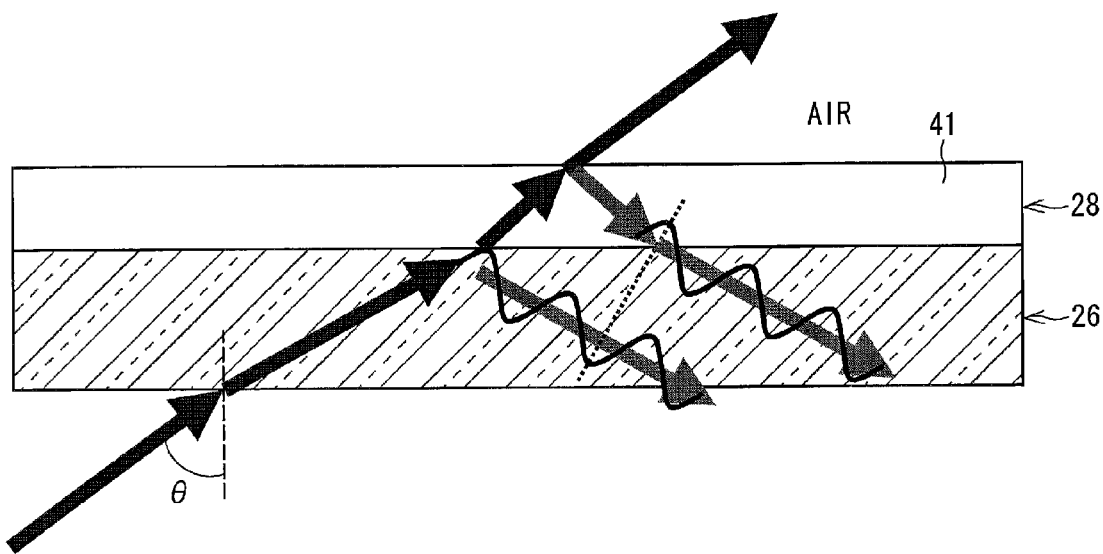

FIG. 11 is a cross-sectional view schematically illustrating how reflected light is reduced by an antireflection layer made from a dielectric material.

FIG. 12 is a cross-sectional view illustrating an example of the antireflection layer made from the dielectric material.

Figure 13:
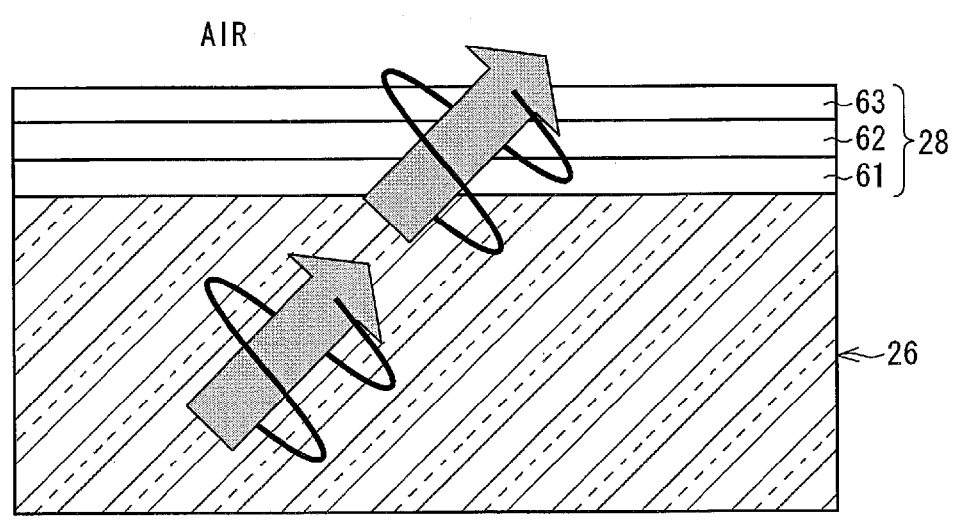

FIG. 13 is a cross-sectional view illustrating another example of the antireflection layer 28 made from the dielectric material.

Figure 14:
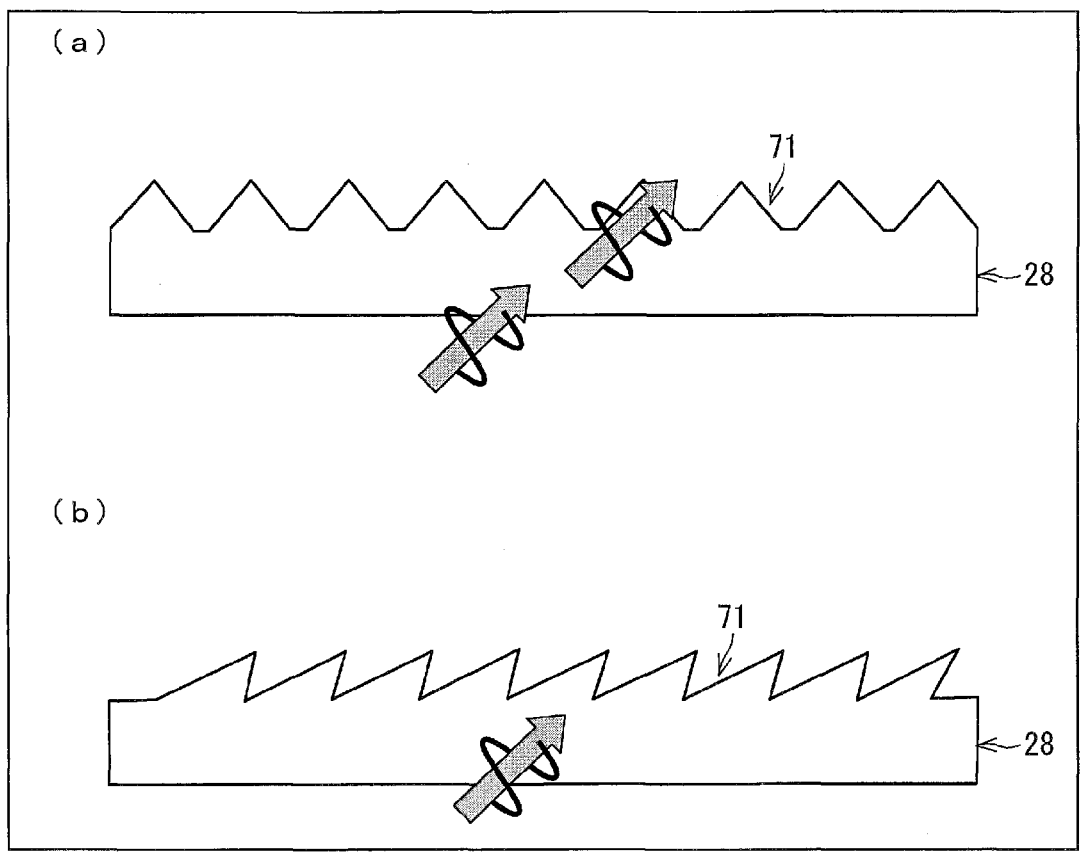

(a) of FIG. 14 and (b) of FIG. 14 are cross-sectional views each schematically illustrating a configuration of an antireflection layer having a minute convexoconcave structure.

Figure 15:
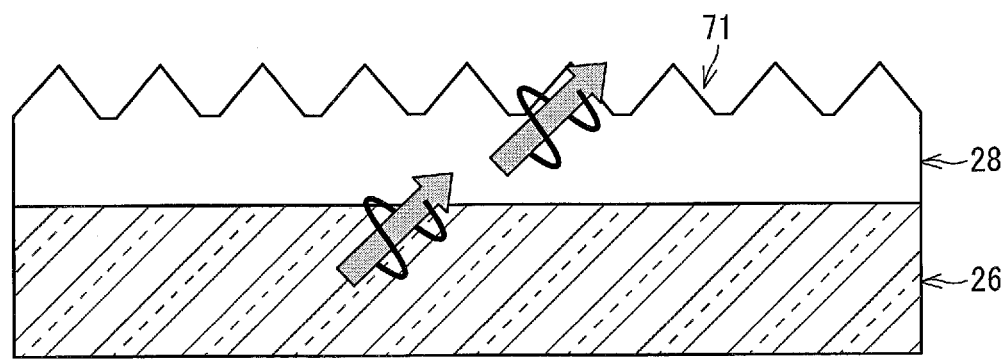

FIG. 15 is a cross-sectional view illustrating an example formation of the antireflection layer having the minute convexoconcave structure.

Figure 16:
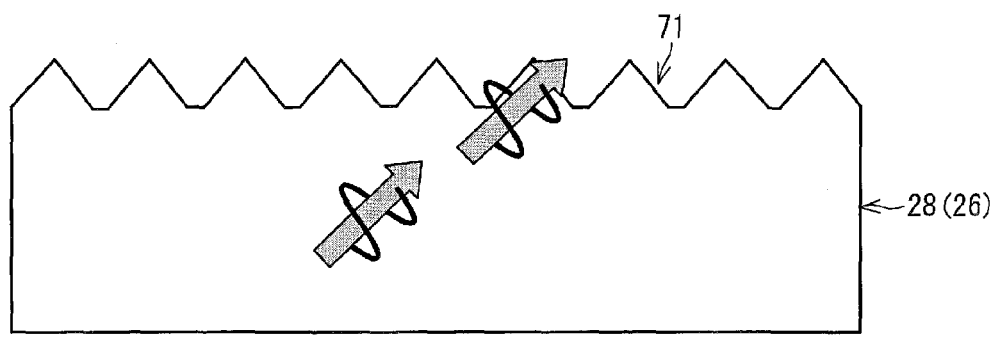

FIG. 16 is a cross-sectional view illustrating another example formation of the antireflection layer having the minute convexoconcave structure.

Figure 17:
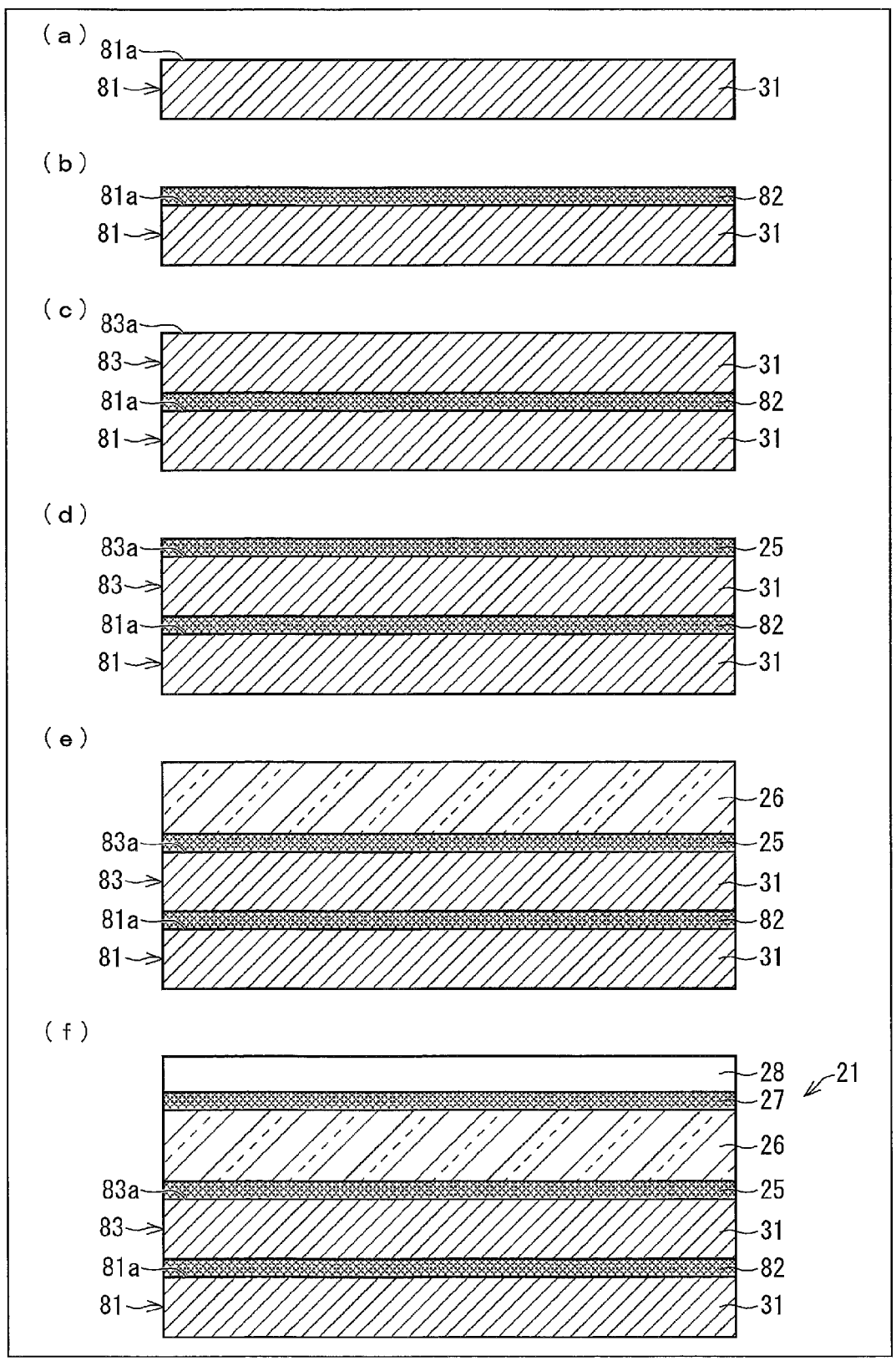

(a) of FIG. 17 through (f) of FIG. 17 are cross-sectional views illustrating, in order of step, a method of producing a second sensor body of the touch panel.

Figure 18:
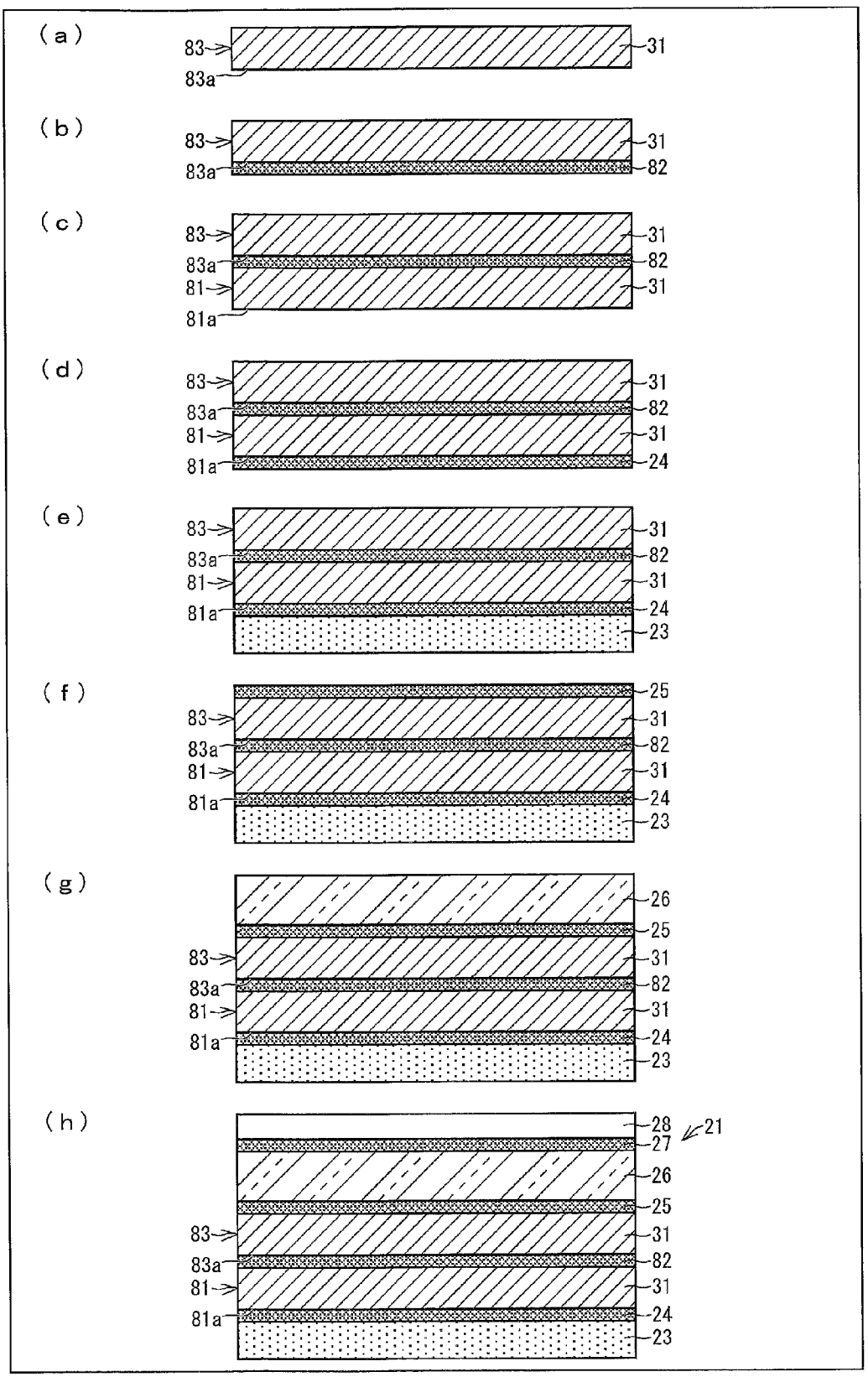

(a) of FIG. 18 through (h) of FIG. 18 are cross-sectional views illustrating, in order of step, a method of producing a third sensor body of the touch panel.

Figure 19:
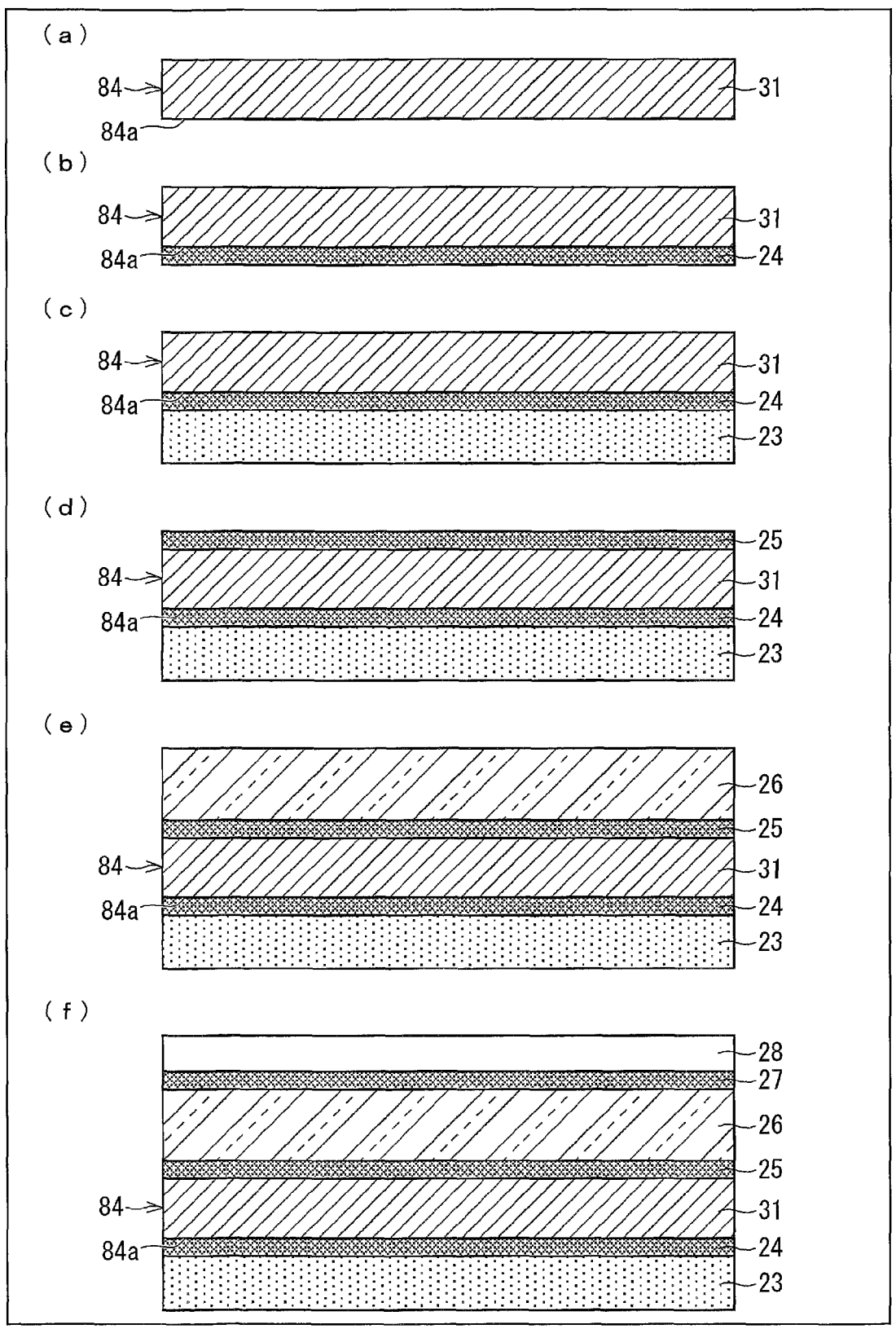

(a) of FIG. 19 through (f) of FIG. 19 are cross-sectional views illustrating, in order of step, a method of producing a fourth sensor body of the touch panel.

Figure 20:
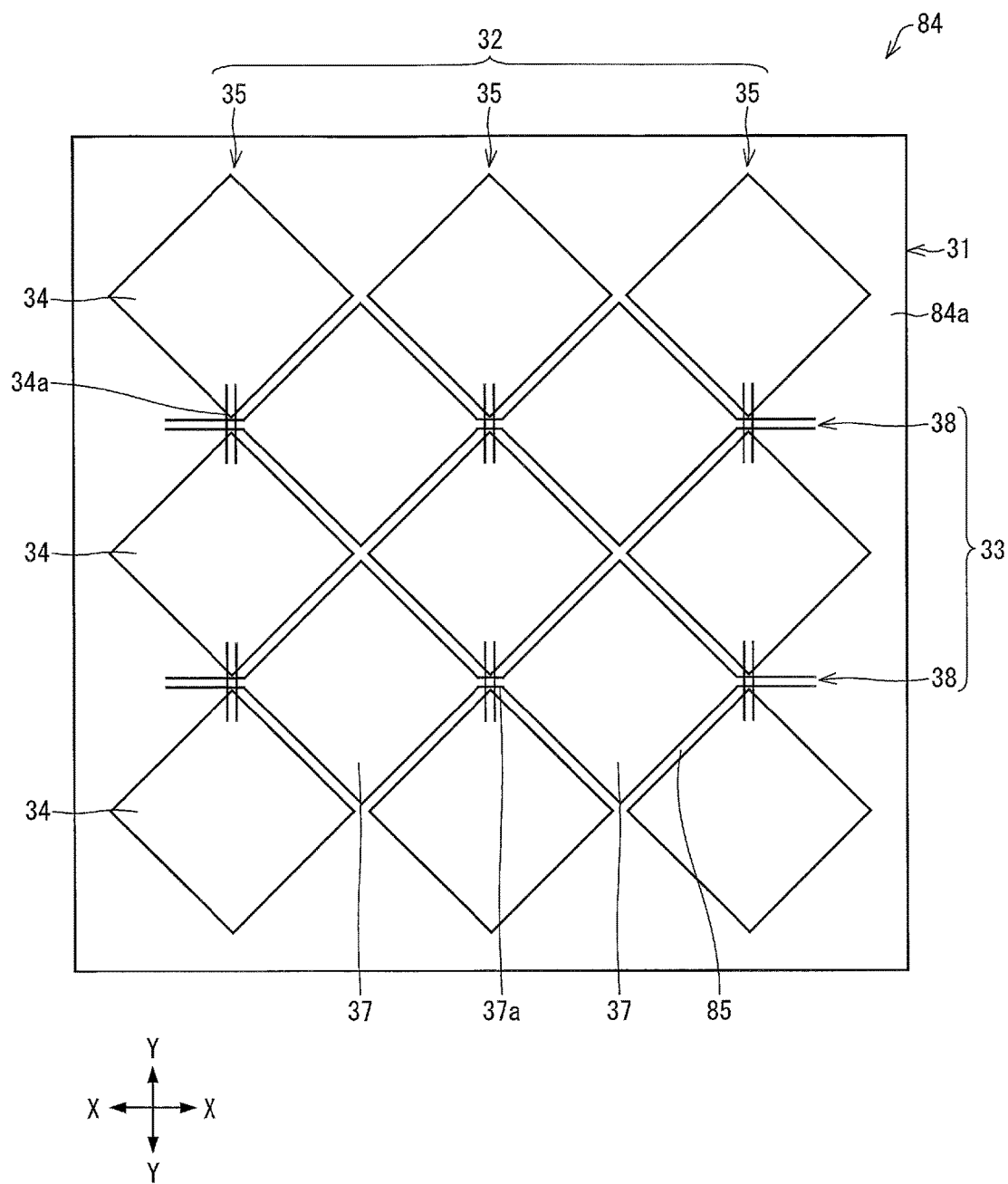

FIG. 20 is a plain view illustrating pattern shapes of a Y electrode pattern and an X electrode pattern on a single-side sensor film.

(a) of FIG. 21 through (d) of FIG. 21 are cross-sectional views illustrating, in order of step, a method of producing a fifth sensor body of the touch panel.

Figure 22:
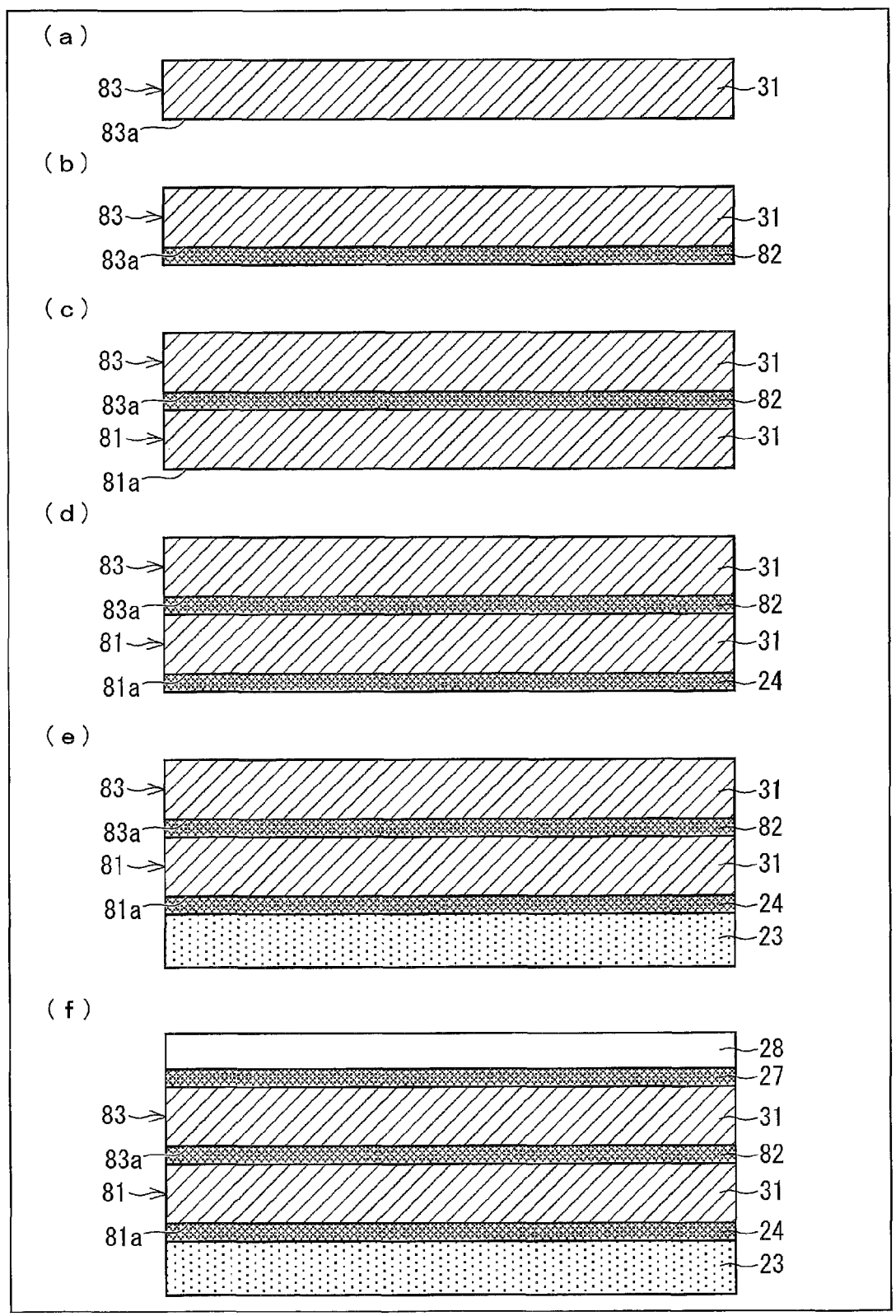

(a) of FIG. 22 through (f) of FIG. 22 are cross-sectional views illustrating, in order of step, a method of producing a sixth sensor body of the touch panel.

DESCRIPTION OF EMBODIMENTS

Figure 1:
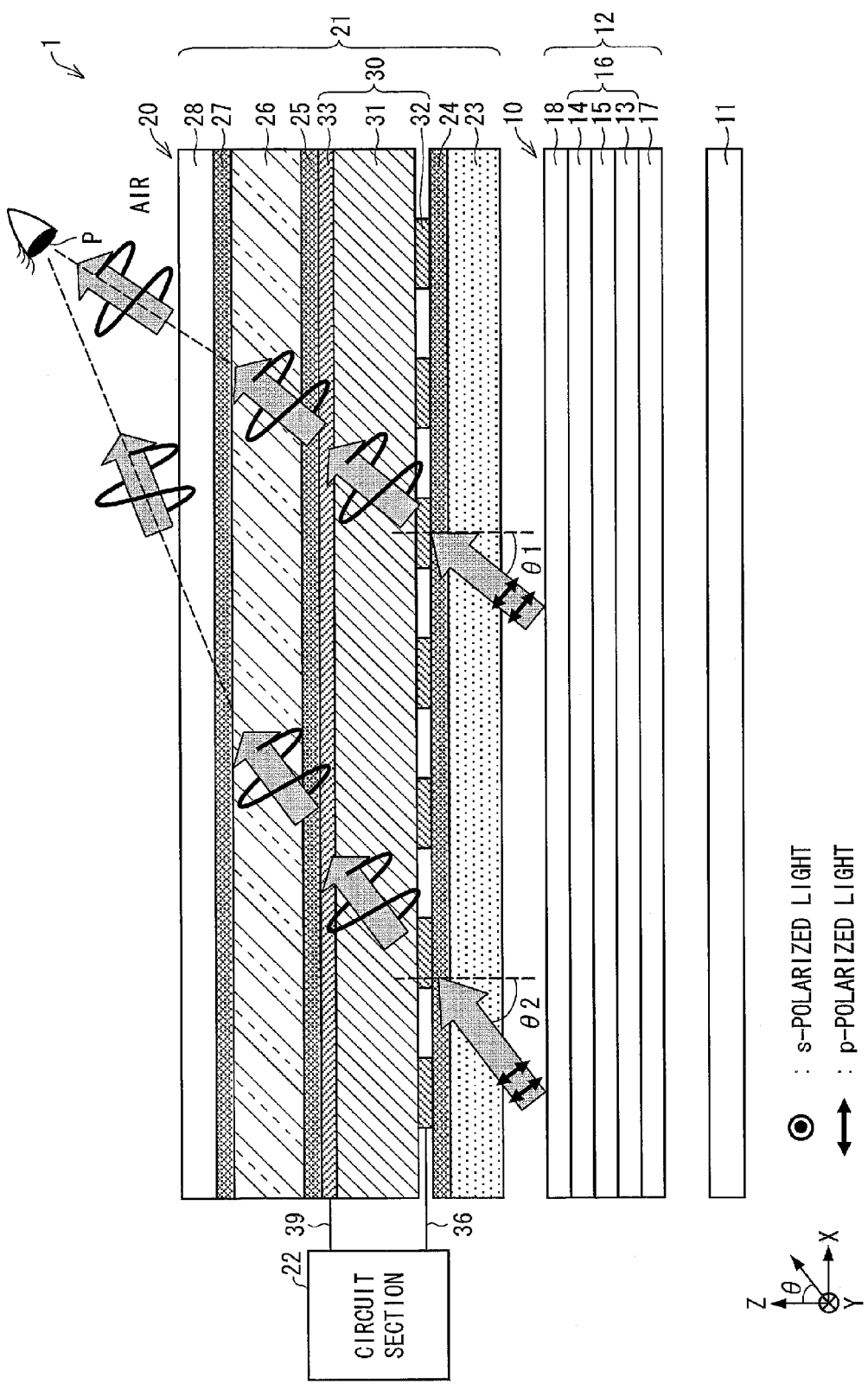
FIG. 1 is an exploded cross-sectional view schematically illustrating a configuration of a main part of a display device of an embodiment of the present invention.

The following description will discuss an embodiment of the present invention with reference to FIG. 1 through (a) through (f) of FIG. 22.

FIG. 1 is an exploded cross-sectional view schematically illustrating a configuration of a main part of a display device 1 of the present embodiment.

<Schematic Configuration of Display Device 1>

The display device 1 of the present embodiment is a display device provided with a touch panel. The display device 1 includes (i) a main body 10 (display section) constituted by a display which emits polarized light and (ii) a touch panel 20 (sensor section) (see FIG. 1).

Note that, in the present embodiment, an observer side (display surface side) is hereinafter referred to as an upper surface side or a front surface side, whereas a side opposite to the observer side is hereinafter referred to as a lower surface side or a back surface side.

<Main Body 10 of Display Device 1>

Examples of the main body 10 constituted by the display which emits polarized light encompass a display device, such as a liquid crystal display device, which includes a display panel on which surfaces polarizing plates are provided.

The main body 10 such as the liquid crystal display device includes, for example, (i) a display panel 12 such as a liquid crystal panel and (ii) a backlight 11 which emits light so that the light enters the display panel 12 (see FIG. 1).

The display panel 12 such as the liquid crystal panel includes (i) a display cell 16 in which a layer of a display medium such as liquid crystal, i.e., an optical modulation layer 15 is sandwiched between a pair of substrates 13 and 14 and (ii) a pair of polarizing plates 17 and 18 (a lower polarizing plate and an upper polarizing plate) which are provided as a polarizer and an analyzer outside the display cell, i.e., on opposite surfaces of the display cell 16 which are (i) a first surface of the substrate 13 which first surface is opposite to a second surface of the substrate 13 which second surface faces the optical modulation layer 15 and (ii) a first surface of the substrate 14 which first surface is opposite to a second surface of the substrate 14 which second surface faces the optical modulation layer 15.

Note that an electrode etc. (not illustrated) which generates an electric field to be applied to the optical modulation layer 15 is provided on a surface of at least one of the pair of substrates 13 and 14 which surface faces the other of the pair of substrates 13 and 14.

The present embodiment will describe below a case where the display panel 12 is the liquid crystal panel, and the main body 10 is the liquid crystal display device.

The liquid crystal panel used in the present embodiment is not particularly limited. Publicly-known various liquid crystal panels can be employed as the liquid crystal panel. A display method (driving method) of the display panel is neither limited to a specific method. Publicly-known various methods such as a TN (Twisted Nematic) method can be employed as the display method. Note that, since this configuration of the liquid crystal panel is conventionally publicly-known, the configuration is neither described in detail nor illustrated.

<Touch Panel 20>

The touch panel 20 of the present embodiment is an electrostatic capacitive touch panel. The touch panel 20 includes (i) a sensor body 21 that is a touch sensor, provided on the main body 10 and (ii) a circuit section 22 connected to the sensor body 21 (see FIG. 1).

An electrostatic capacitive touch sensor includes an electrode pattern (sensor electrode pattern) formed on a single surface or opposite surfaces of a single birefringent base material (birefringence base material) or a layer stack in which birefringent base materials are stacked.

The sensor body 21 of the present embodiment is configured to include a protection film 23 (first protection layer), an adhesive layer 24 (first adhesive layer), a double-side sensor film 30, an adhesive layer 25 (second adhesive layer), a protection plate 26 (second protection layer), an adhesive layer 27 (third adhesive layer), and an antireflection layer 28, which are provided in this order from a main body 10 side (see FIG. 1).

<Double-Side Sensor Film 30>

The double-side sensor film 30 is configured to include (i) a birefringent base material 31 and (ii) a Y electrode pattern 32 (first electrode pattern) and an X electrode pattern 33 (second electrode pattern) which are provided as electrode patterns on respective back and front surfaces of the birefringent base material 31.

(a) of FIG. 2 is a plain view illustrating a pattern shape of the Y electrode pattern 32. (b) of FIG. 2 is a plain view illustrating a pattern shape of the X electrode pattern 33.

As illustrated in (a) of FIG. 2, the Y electrode pattern 32 is constituted by a Y electrode group consisting of a plurality of Y electrode columns 35 in each of which Y electrode columns 35 a plurality of Y electrodes 34 are aligned in a Y direction (a Y-axis direction that is a column direction, a first direction). A Y electrode 34 is a substantially-rectangular island-shaped electrode. The plurality of Y electrodes 34 are connected at their corner portions to a connection line 34a in the Y direction.

On the other hand, as illustrated in (b) of FIG. 2, the X electrode pattern 33 is constituted by an X electrode group consisting of a plurality of X electrode rows 38 in each of which X electrode rows 38 a plurality of X electrodes 37 are aligned in an X direction (an X-axis direction that is a row direction, a second direction). An X electrode 37 is a substantially-rectangular island-shaped electrode. The plurality of X electrodes 37 are connected at their corner portions to a connection line 37a in the X direction.

When viewed from above (i.e., when viewed from a direction perpendicular to a film surface of the double-side sensor film 30), these Y electrodes 34 and X electrodes 37 are arranged so that (i) each of the Y electrodes 34 is located between corresponding two adjacent ones of the X electrodes 37 and (ii) each of the X electrodes 37 is located between corresponding two adjacent ones of the Y electrodes 34. When viewed from above and from an oblique direction, these Y electrodes 34 and X electrodes 37 are arranged alternately so as to form a checkered pattern, and are arranged alternately in the Y direction and in the X direction.

These Y electrodes 34 and X electrodes 37 are a position detecting electrode which detects a change in electrostatic capacitance to detect a position of coordinates specified by a detecting object such as a finger. These Y electrodes 34 and X electrodes 37 are arranged in a region corresponding to a display region of the display panel 12.

As illustrated in (a) of FIG. 2, each of the Y electrode columns 35 has an end part at which a drawing wiring 36 is provided in a direction in which the each of the Y electrode columns 35 extends. Similarly, as illustrated in (b) of FIG. 2, each of the X electrode rows 38 has an end part at which a drawing wiring 39 is provided in a direction in which the each of the X electrode rows 38 extends. Each of the drawing wirings 36 and 39 is a detection line for drawing a detection signal from a corresponding one of the Y electrode columns 35 and the X electrode rows 38. These drawing wirings 36 and 39 are provided in a region corresponding to a frame region of the display panel 12. These drawing wirings 36 and 39 are connected to the circuit section 22 (see FIG. 1).

Ones of the Y electrodes 34 and the X electrodes 37 are employed as drive electrodes, whereas the others of the Y electrodes 34 and the X electrodes 37 are employed as sense electrodes. The Y electrodes 34 are configured so that a driving circuit section (not illustrated) applies a driving voltage to the Y electrodes 34. The X electrodes 37 are configured so that a driving circuit section (not illustrated) applies a driving voltage to the X electrodes 37.

These Y electrodes 34 and X electrodes 37 form electrostatic capacitance by the driving voltage being applied thereto. The electrostatic capacitance which is being formed by these Y electrodes 34 and X electrodes 37 changes when a tip of a finger that is an electric conductor, serving as the detecting object, comes into contact with a surface of the touch panel 20. By detecting quantity of change in the electrostatic capacitance, it is possible to detect a coordinate position of an X coordinate and a Y coordinate at which coordinate position the tip of the finger came into contact with the surface of the touch panel 20.

<Circuit Section 22>

As has been described, (i) the drawing wiring 36 provided at the end part of the each of the Y electrode columns 35 of the double-side sensor film 30, and (ii) the drawing wiring 39 provided at the end part of the each of the X electrode rows 38 of the double-side sensor film 30, are connected to the circuit section 22 (see FIG. 1).

As the circuit section 22 employed is an IC chip, an FPC (Flexible Printed Circuit) substrate, or the like.

The circuit section 22 includes, for example, a position detecting circuit (not illustrated) for detecting a coordinate position of the detecting object. The position detecting circuit detects the quantity of change in the electrostatic capacitance formed by the Y electrodes 34 and the X electrodes 37, and calculates a position of the tip of the finger based on the quantity of change.

Note that a publicly-known circuit can be employed as the position detecting circuit. Examples of the publicly-known circuit include a mutual capacitive position detecting circuit which is in widespread use in an electrostatic capacitive touch panel. The position detecting circuit is not limited to a specific one.

<Protection Layer and Adhesive Layer>

As has been described, the protection film 23 is adhered via the adhesive layer 24 to a back surface side (lower surface side) of the double-side sensor film 30 so as to protect a sensor surface (electrode forming surface) on the back surface side (lower surface side) of the double-side sensor film 30. Further, the protection plate 26 is adhered via the adhesive layer 25 to a front surface side (upper surface side) of the double-side sensor film 30 so as to protect a sensor surface on the front surface side (upper surface side) of the double-side sensor film 30.

As these protection layers (the protection film 23 and the protection plate 26) employed are, e.g., (i) a plastic film or a plastic substrate made from a transparent resin such as polyethylene terephthalate (PET), triacetyl cellulose (TAC), polycarbonate (PC) or polymethyl methacrylate (PMMA), and (ii) a glass substrate such as a cover glass.

It is possible to adhere these protection layers to the double-side sensor film 30, for example, by combining the plastic film or the plastic substrate, the glass substrate, and the like with the double-side sensor film 30 via the adhesive layers 24 and 25.

These protection layers are not particularly limited in their thicknesses. The thicknesses can be determined in the same manner as that of a protection layer (a protection plate, a protection sheet) for conventional use in a touch panel.

As the adhesive layers 24, 25 and 27 employed is an adhesive material such as an OCAT (Optical Clear Adhesive Tape).

<Antireflection Layer 28>

The antireflection layer 28 used in the present embodiment is a layer which reduces reflection of polarized light which has exited from the display panel 12. The antireflection layer 28 reduces, for example, reflection of polarized light which has exited from the display panel 12 and has passed through the birefringent base material 31, the polarized light being reflected (i) on an interface having a polarization effect and (ii) at a viewing angle at which a different in transmittance between an s-wave and a p-wave on the interface is not less than 10%.

That is, by being provided on a first surface of the touch panel 20 which first surface is opposite to a second surface of the touch panel 20 which second surface faces the display panel 12, the antireflection layer 28 reduces reflection of the polarized light which is reflected on the first surface toward the display panel 12 at the viewing angle at which the different in the transmittance between the s-wave and the p-wave is not less than 10%.

Examples of the antireflection layer 28 include (i) an antireflection layer made from a dielectric material and (ii) an antireflection layer having a minute convexoconcave structure, which is a minute structure.

Preferable and further specific examples of the antireflection layer 28 include (i) a multilayer AR (Anti-Reflective) film which prevents reflection of light with use of interference of the light and (ii) a non-reflection film which has curved protrusions on its surface and a refractive index which consecutively changes in a direction of a thickness of the film, i.e., a non-reflection film having a so-called moth-eye structure.

Examples of the AR film include a film in which (i) a plastic film made from, e.g., TAC or PET is employed as a base material and (ii) a plurality of layers of dielectrics different in refractive index from each other are stacked.

A publicly-known AR film can be employed as the film. Examples of the publicly-known AR film include a film in which (i) a hard coat layer is formed on a base material and (ii) a high-refractive layer (containing an ionic liquid) and a low-refractive layer (containing hollow silica fine particles) are alternately stacked on the hard coat layer (see, for example, Patent Literature 3).

Examples of the antireflection layer having the minute convexoconcave structure include a film having a surface that has a minute convexoconcave pattern that has a convexoconcave cycle which is controlled to be not more than a wavelength of visible light.

For example, a publicly-known film having a moth-eye structure can be employed as the film. It is possible to form the film with use of a metal mold etc. by building a minute structure of a thermosetting resin or a photo-curable resin on a base material of the film (see, for example, Patent Literature 4).

It is possible to form the antireflection layer 28 on the protection plate 26 via the adhesive layer 27 (see FIG. 1), for example, by combining the antireflection layer 28 with the protection plate 26 via the adhesive material such as the OCAT (Optical Clear Adhesive Tape).

Note, however, that the adhesive layer 27 does not need to be essentially provided between the antireflection layer 28 and the protection plate 26, though the above has described a case where the adhesive layer 27 is provided between the antireflection layer 28 and the protection plate 26. The antireflection layer 28 may be provided directly on the protection plate 26 by means of lamination, printing, etc.

Note also that the antireflection layer 28 does not need to be essentially provided on the protection plate 26, though the above has described a case where the antireflection layer 28 is formed on the protection plate 26. The antireflection layer 28 may be directly formed on an upper surface of the protection plate 26 by minutely processing the upper surface of the protection plate 26. In other words, the antireflection layer 28 may also serve as the protection plate 26.

Note that, in a case where the AR film is employed as the antireflection layer 28 (as has been described), a commercially-available antireflection film can be employed as the AR film.

On the other hand, it is possible to optimally design the antireflection layer 28 by forming the antireflection layer 28 so as to eliminate reflected light at a viewing angle at which rainbow unevenness easily occurs.

In a case where the antireflection layer 28 is optimally designed, the antireflection layer 28 is more desirably a layer stack including a multilayer film in which a plurality of dielectric layers different in refractive index from each other are stacked, in terms of an antireflection effect and a design characteristic.

<Method of Producing Touch Panel 20>

Of a method of producing the touch panel 20, a method of producing the sensor body 21 of the touch panel 20 will be described below with reference to (a) of FIG. 3 through (f) of FIG. 3.

(a) of FIG. 3 through (f) of FIG. 3 are cross-sectional views illustrating, in order of step, the method of producing the sensor body 21 of the touch panel 20. Note that (a) of FIG. 3 does not illustrate drawing wirings 36 and 39, and (b) of FIG. 3 through (f) of FIG. 3 do not illustrate a Y electrode pattern 32, an X electrode pattern 33, and the drawing wirings 36 and 39.

First, the X electrode pattern 33 and the Y electrode pattern 32 are formed on respective front and back surfaces of a birefringent base material 31 with use of, e.g., a transparent electrode or a meshed thin metallic wire, so that a double-side sensor film 30 is formed (see (a) of FIG. 3).

The X electrode pattern 33 and the Y electrode pattern 32 can be formed, for example, by (1) combining a metallic foil with the birefringent base material 31, and then etching the metallic foil by means of publicly-known lithography etc., (2) sputtering metal on the birefringent base material 31, or (3) printing metallic paste on the birefringent base material 31.

Examples of the birefringent base material 31 include an insulating base material made from a transparent resin such as polyethylene terephthalate (PET), polycarbonate (PC), or polymethyl methacrylate (PMMA).

Generally, a birefringent index of the birefringent base material 31 is neither controlled nor uniform in a plane of the birefringent base material 31. That is, the birefringent index varies in the plane of the birefringent base material 31.

Examples of the metallic foil include a copper foil. Examples of the metal which is sputtered on the birefringent base material 31 include silver. Examples of the metallic paste include silver paste containing silver fine particles.

In a case where the Y electrode pattern 32 and the X electrode pattern 33 are formed with use of the transparent electrode, examples of an electrode material for the transparent electrode include a transparent electrically-conductive material that contains an oxide such as an ITO (indium tin oxide), an IZO (indium zinc oxide), a zinc oxide, or a tin oxide.

A size, thickness, line width, and the like of each electrode (Y electrode 34 and X electrode 34) of the Y electrode pattern 32 and the X electrode pattern 33 can be determined in the same manner as those of an electrode in a conventional touch panel. The size, thickness, line width, and the like need only to be determined as appropriate according to the electrode material so that a desired physical property is obtained.

After the double-side sensor film 30 is formed, an adhesive layer 24 such as an OCAT is formed on a lower surface side of the double-side sensor film 30 (see (b) of FIG. 3). Then, a protection film 23 is adhered via the adhesive layer 24 to the double-side sensor film 30 (see (c) of FIG. 3).

Subsequently, an adhesive layer 25 such as an OCAT is formed on an upper surface side of the double-side sensor film 30 (see (d) of FIG. 3). Then, a protection plate 26 is adhered via the adhesive layer 25 to the double-side sensor film 30 (see (e) of FIG. 3).

Thereafter, an adhesive layer 27 such as an OCAT is formed on the protection plate 26 (see (f) of FIG. 3). Then, an antireflection layer 28 such as an AR film is adhered via the adhesive layer 27 onto the protection plate 26, i.e., so that a surface of the antireflection layer 28 is a top surface of the touch panel 20 (a top surface of the sensor body 21).

<Rainbow-Like Color Band (Rainbow Unevenness) Generation Mechanism>

Before describing an effect of the display device 1 of the present embodiment, a rainbow-like color band (rainbow unevenness) generation mechanism will be described below.

In terms of cost, heat resistance, etc., a birefringent base material made from, e.g., PET is generally employed as a base material of a sensor film of a touch sensor. On the other hand, a birefringent index of the birefringent base material is neither controlled nor uniform in a plane of the birefringent base material, as has been described.

Linearly-polarized light which has entered the birefringent base material, which is neither controlled nor uniform in the plane of the birefringent base material, causes a phase shift. In a case where a touch panel including this birefringent base material is provided on a display panel, such as a liquid crystal panel, from which polarized light exits, a rainbow-like color band is generated on a display screen at a certain viewing angle.

"Rainbow-like color band" is a phenomenon induced due to a difference, from one wavelength to another, in quantity of light which can pass through a layer having a linear polarization effect after the light passes through a birefringent base material. The difference is made by the birefringent base material converting linearly-polarized light so that the linearly-polarized light has a polarization direction which differs from one wavelength to another.

The rainbow-like color band (rainbow unevenness) generation mechanism will be specifically described below with reference to (a) and (b) of FIG. 4 through FIG. 10.

(a) of FIG. 4 and (b) of FIG. 4 are exploded perspective views each schematically illustrating polarized light obtained in a case where a birefringent film base material employed as a birefringent base material is sandwiched between (i) a polarizing plate (polarizer) provided on an upper surface side of a liquid crystal panel and (ii) a polarizing plate (analyzer) provided on an upper surface side of the birefringent film base material.

Specifically, (a) of FIG. 4 is an exploded perspective view illustrating a case where an optical axis of the birefringent film base material is not identical in direction to an absorption axis of the polarizing plate of the liquid crystal panel, whereas (b) of FIG. 4 is an exploded perspective view illustrating a case where the optical axis of the birefringent film base material is identical in direction to the absorption axis of the polarizing plate of the liquid crystal panel. Note that two-directional arrows in (a) and (b) of FIG. 4 represent p-polarized light.

As illustrated in (b) of FIG. 4, in a case where an optical axis of a birefringent film base material 102 is identical in direction to an absorption axis of a polarizing plate 101 of the liquid crystal panel, an oscillatory electric field is not decomposed along the optical axis of the birefringent film base material 102, and polarized light which has entered the birefringent film base material 102 is kept as it is. Therefore, the polarized light which has entered the birefringent film base material 102 is absorbed by a polarizing plate 103.

On the other hand, as illustrated in (a) of FIG. 4, in a case where the optical axis of the birefringent film base material 102 is identical in direction to the absorption axis of the polarizing plate 101 of the liquid crystal panel (i.e., a case where the direction of the optical axis of the birefringent film base material 102 is not identical to a polarization direction of polarized light which exits from the liquid crystal panel), the oscillatory electric field is decomposed along the optical axis of the birefringent film base material 102. In this case, a phase difference (retardation) is made due to a difference in propagation velocity between p-polarized light and s-polarized light. This causes polarized light which has entered the birefringent film base material 102 to optically rotate.

Note that a phase difference differs depending on a wavelength, whereby degree of polarization differs depending on the wavelength. Therefore, polarized light which has entered the birefringent film base material 102 and has passed through the polarizing plate 103 is dispersed (see (a) of FIG. 4).

As such, in a case where linearly-polarized light, into which light is polarized by being caused to pass through the polarizing plate 101 provided on the upper surface side of the liquid crystal panel, passes through a birefringent base material such as the birefringent film base material 102, polarization of the linearly-polarized light is eliminated (the linearly-polarized light is depolarized). This generates rainbow unevenness.

Note that, even in the case illustrated in (b) of FIG. 4, rainbow unevenness is generated because polarization is not kept (polarization is eliminated) in the birefringent film base material 102 in a direction different from that of the optical axis of the birefringent film base material 102.

The same applies to a case where a touch sensor including the birefringent base material is provided on the liquid crystal panel.

FIG. 5 is an exploded cross-sectional view schematically illustrating the rainbow unevenness generation mechanism.

A display device 2 illustrated in FIG. 5 is identical in configuration to the display device 1 illustrated in FIG. 1 except that the display device 2 does not include, on a protection plate 26, an antireflection layer 28 and an adhesive layer 27 via which the antireflection layer 28 is adhered to the protection plate 26.

Note that FIG. 5 does not illustrate (i) a configuration of a main body 10 of the display device 2 other than a polarizing plate 18 of the main body 10, (ii) a circuit section 22, and (iii) drawing wirings 36 and 39.

In a case where depolarization caused by birefringence (as has been described) is taken into account, it can be said that a sensor body 21 illustrated in FIG. 5 is configured so that the protection plate 26 is provided on a birefringent base material 31 via an adhesive layer 25.

Note that, as has been described, in terms of cost, heat resistance, etc., PET etc. is generally employed as a material for a base material of a sensor film of a touch sensor, and glass is often employed as a material for the protection plate 26.

Therefore, assume in the following description that a PET film is employed as the birefringent base material 31, an OCAT is employed as the adhesive layer 25, and a glass is employed as the protection plate 26.

FIG. 6 is a graph illustrating (i) a relation between a viewing angle and each of a transmittance of an s-wave (s-polarized light) and a transmittance of a p-wave (p-polarized light) on an interface between the OCAT and the PET film, and (ii) a relation between the viewing angle and each of a transmittance of an s-wave and a transmittance of a p-wave on an interface between the glass and the OCAT. FIG. 7 is a graph illustrating a relation between a viewing angle and each of a transmittance of an s-wave and a transmittance of a p-wave on an interface between the glass and an air layer.

As is clear from FIG. 6, the transmittance of the s-wave and the transmittance of the p-wave on the interface between the OCAT and the PET film, and the transmittance of the s-wave and the transmittance of the p-wave on the interface between the glass and the OCAT are constant regardless of the viewing angle.

On the other hand, as illustrated in FIG. 7, a transmittance of polarized light differs depending on a polarization direction on the interface between the glass and the air layer. That is, in a case of interface reflection on the interface between the glass and the air layer, the transmittance of the s-wave and the transmittance of the p-wave on the interface between the glass and the air layer differ from each other depending on the viewing angle. Such a difference between the transmittance of the s-wave and the transmittance of the p-wave causes the interface between the glass and the air layer to serve as an analyzer.

Note that, though FIG. 7 illustrates the relation between the viewing angle and each of the transmittance of the s-wave and the transmittance of the p-wave on the interface between the glass and the air layer, the above-described phenomenon is also induced on an interface between the air layer and a layer other than the glass.

Providing a touch panel on an upper polarizing plate of a display panel such as a liquid crystal panel (as has been described) results in sandwiching a birefringent base material between a polarizer and an analyzer. This structure causes rainbow unevenness to be observed in the same manner as a structure illustrated in (a) of FIG. 4.

Note that, as has been described, rainbow unevenness generated by a display device provided with a touch panel has a close relation with a viewing angle.

The following description will discuss, with reference to FIG. 5, rainbow unevenness generated by a display device provided with a touch panel.

Linearly-polarized light which has been emitted via the polarizing plate 18 from the main body 10 and has entered the birefringent base material 31 is in a polarization state differing from one wavelength to another, due to a birefringent property (wavelength dispersion property) of the birefringent base material 31 (see FIG. 5). Polarized light in the birefringent base material 31 is in a polarization state which differs depending on a viewing angle because a retardation differs depending on the viewing angle.

Light which has passed through the birefringent base material 31 is reflected by the interface between the protection plate 26 and the air layer (air). A reflectivity differs depending on a polarization state. The polarization state differs depending on a wavelength. Therefore, transmitted light is colored.

That is, since degree of polarization differs depending on the wavelength, a difference in the wavelength produces a difference in quantity of light to be reflected. Consequently, a transmission intensity differs from one wavelength to another. As such, polarized light which passes through the birefringent base material 31 having the birefringent property has a transmission intensity which changes depending on a wavelength due to the wavelength dispersion property of birefringence. The polarized light which has passed through the birefringent base material 31 is colored.

Since a retardation differs depending on a viewing angle, light which passes through the interface between the polarizing plate 26 and the air layer, the interface serving as an analyzer, has a wavelength which differs depending on the viewing angle. Therefore, the light is recognized as rainbow unevenness (rainbow-like color band).

As has been described, PET is the material for the birefringent base material, and has a non-uniform refractive index. In a case where linearly-polarized light which enters and passes through the birefringent base material having the non-uniform refractive index is divided into three linearly-polarized beams of light of respective x-axis, y-axis, and z-axis directions, a phase difference (retardation) is made among the three linearly-polarized beams of light due to birefringence (difference in refractive index).

In a case where the display device 2 is viewed from a direction oblique by an angle θ with respect to a direction perpendicular to a surface of the birefringent base material 31, a birefringence No on, e.g., an x-z plane is represented by Expression 1 below.

$$N_\theta = \frac{n_x n_z}{\sqrt{n_x^2 \cos^2\theta + n_z^2 \sin^2\theta}} \quad \text{[Expression 1]}$$

where (i) $n_x$ and $n_y$ represent a main refractive index of an in-plane of the birefringent base material 31, i.e., a main refractive index in a direction parallel to the surface of the birefringent base material 31 and in a right-and-left direction of FIG. 5 (x-axis direction), and a main refractive index in the direction parallel to the surface of the birefringent base material 31 and in a direction from a front side of FIG. 5 to a back side of FIG. 5 (y-axis direction), respectively, (ii) $n_z$ represents a main refractive index in the direction perpendicular to the surface of the birefringent base material 31 (z-axis direction), and (iii) θ represents a viewing angle at a certain viewing point P.

A retardation R on the x-z plane is represented by Expression 2 below.

$$R = \frac{n_x n_z d}{\cos\theta \sqrt{n_x^2 \cos^2\theta + n_z^2 \sin^2\theta}} \quad \text{[Expression 2]}$$

where d represents a thickness of the birefringent base material 31.

A phase difference on the x-z plane is represented by Expression 3 below.

$$\frac{n_x n_z d}{\lambda \cos\theta \sqrt{n_x^2 \cos^2\theta + n_z^2 \sin^2\theta}} \quad \text{[Expression 3]}$$

where λ represents a wavelength of light which passes through the interface between the protection plate 26 and the air layer.

Note that, in a case where the birefringent base material 31 is made from PET (as has been described), the PET has refractive indexes $n_x$, $n_y$, and $n_z$ of 1.665, 1.661, and 1.492, respectively.

As such, the phase difference differs depending on λ (wavelength) and θ (viewing angle, observation position). Therefore, an intensity of the wavelength of the light which passes through the analyzer (the interface between the protection plate 26 and the air layer) differs depending on the viewing angle.

An example illustrated in FIG. 5 shows that, in a case where the viewing angle is θ1, blue light (B), green light (G), and red light (R) are less reflected in this order, in other words, transmission intensities thereof increase in this order, whereas in a case where the viewing angle is θ2, red light (R), blue light (B), and green light (G) are less reflected in this order, in other words, transmission intensities thereof increase in this order.

As illustrated in FIG. 7, in a case of interface reflection, a transmittance of polarized light differs depending on a polarization state of the polarized light.

FIG. 8 is a graph illustrating a relation between a viewing angle and a difference in transmittance between a p-wave and an s-wave.

In a case where the protection plate 26 is a glass, a color starts to be recognized when the difference in the transmittance between the p-wave and the s-wave (which is set to 1 when it is 100%) reaches approximately 0.1 (i.e., 10%) (the viewing angle θ is approximately 48°), and the difference in the transmittance is maximized when the viewing angle θ is approximately 80° (see FIG. 8). At such a maximum difference in transmittance, transmitted light is deep colored.

Thus, rainbow unevenness is visually recognized in the vicinity of a Brewster's angle due to polarization caused by interface reflection.

Brewster's angle is an incidence angle at which light to be reflected by an interface between substances different in refractive index from each other becomes completely S-polarized light. Brewster's angle is defined by arctan (n2/n1) where n1 represents a refractive index of one of substances different in refractive index which one light enters, and n2 represents a refractive index of one of the substances different in refractive index through which one light passes.

At a Brewster's angle, p-polarized light which oscillates in an electric field of a direction parallel to a light entering surface has a reflectivity of 0 (0%), and only s-polarized light which oscillates in an electric field of a direction perpendicular to the light entering surface is reflected.

Therefore, of light which has entered at an angle closer to the Brewster's angle, p-polarized light has an interfacial reflectivity of 0, whereas s-polarized light is reflected. Transmitted light includes more p-polarized light than s-polarized light. That is, linear polarization of the light proceeds. Therefore, rainbow unevenness is remarkably generated, and visually recognized. Note that, in a case where an incidence angle equals to a Brewster's angle, an angle between transmitted light (refracted light) and reflected light is 90°.

Note that, since light in the direction perpendicular to the surface of the birefringent base material 31 (viewing angle θ is 0°) has no different in transmittance between an s-wave and a p-wave, none of layers constitute the sensor body 21 serves as an analyzer. Therefore, no rainbow unevenness is observed at the viewing angle θ of 0°.

FIG. 9 is a view illustrating a relation between (i) a size of a display surface (display size) of the display device 2 configured as illustrated in FIG. 5 and (ii) viewing angles $\theta_1$ through $\theta_3$ and a viewing distance L. Note that FIG. 9 illustrates a case where the display surface of the display device 2 is horizontally placed, and viewed obliquely and from above.

In FIG. 9 where a display screen of the display device 2 is observed obliquely, (i) $\theta_1$ represents a central viewing angle (display central viewing angle) at a center point p1 of the display screen, (ii) $\theta_2$ represents a viewing angle at a point p2 on a center line of the display screen which point p2 is present on an edge of the display screen, the edge being closer to an observer, (iii) $\theta_3$ represents a viewing angle at a point p3 on the center line of the display screen which point p3 is present on another edge of the display screen, the another edge being more distant from the observer, and (iv) L represents a viewing distance at the central viewing angle $\theta_1$ (i.e., a distance between the center point p1 and a viewing point P of the observer). FIG. 10 is a graph illustrating a viewing angle range (from $\theta_2$ to $\theta_3$) for each display size in a case where the viewing distance L is 40 cm and the central viewing angle $\theta_1$ is 30°.

As illustrated in FIG. 10, in a case where the display device 2, having a 15-inch display size, is observed at the viewing distance L of 40 cm and the central viewing angle $\theta_1$ of 30°, a viewing angle at an edge of a display is approximately 48° at which (i) the observer starts recognizing colored transmitted light and (ii) a difference in transmittance is approximately 0.1. Therefore, an observer who observes a display device 2 whose display size is not smaller than 15 inches constantly recognizes rainbow unevenness.

<Measures to be Taken Against Rainbow-Like Color Band (Rainbow Unevenness)>

Rainbow unevenness remarkably impairs performance of a display device. It is therefore necessary to eliminate the rainbow unevenness.

As has been described, rainbow unevenness is generated by (i) a change in polarization state that differs from one wavelength to another, the change being caused due to a birefringent base material, and (ii) a dependency, on the polarization state, of interface reflection on an interface with an air layer.

Specifically, rainbow unevenness is generated due to (i) a phase shift of linearly-polarized light which phase shift is caused due to a birefringent property of a birefringent base material 31 and (ii) a polarization effect. Rainbow unevenness is generated, particularly by a polarization effect brought about by interface reflection in the vicinity of a Brewster's angle.

Note that, even if light emitted from a main body 10 of a display device is converted into circularly-polarized light, linear polarization of the circularly-polarized light proceeds due to interface reflection on an interface between a birefringent base material and a layer which is adjacent to the birefringent base material and made from a material different from that for the birefringent base material. Therefore, even if the light emitted from the main body 10 of the display device is converted into the circularly-polarized light, it is not possible to prevent rainbow unevenness from being generated, particularly in the vicinity of a Brewster's angle.

According to the present embodiment, however, it is possible to prevent such generation of the rainbow unevenness.

That is, since interface reflection brings about a polarization effect, it is possible to prevent rainbow unevenness by suppressing the polarization effect brought about by the interface reflection.

Particularly, in a case of the display device 2 including no antireflection layer 28 (see FIG. 5), interface reflection most remarkably occurs on an interface with the air layer which interface has a great difference in transmittance, for example, on the interface between the air layer and the protection plate 26 made of glass etc.

It is therefore possible to prevent rainbow unevenness by suppressing the interface reflection on the interface between the air layer and a touch panel 20 (e.g., the interface reflection on the interface between the air layer and the protection plate 26 made of glass etc.)

That is, it is possible to reduce rainbow unevenness by providing, on an interface between the air layer and the display device 2, i.e., on an upper surface of the protection plate 26 that is a top surface of the touch panel 20, an antireflection layer 28 (see FIG. 1) which prevents reflection of polarized light emitted from the main body 10 of the display device 2.

As has been described, colored light starts to be recognized particularly when a difference in transmittance between an s-wave and a p-wave is approximately 0.1 (10%).

It is therefore possible to prevent rainbow unevenness from being recognized, by providing, on an interface having a polarization effect, an antireflection layer 28 which prevents light, which has been emitted from a main body 10 of a display device and has passed through a birefringent base material such as a birefringent base material 31, from being reflected by the interface at a viewing angle at which a difference in transmittance between an s-wave and a p-wave on the interface is not less than 0.1.

It is possible to prevent colored light from being recognized, by reducing interface reflection so that the difference in the transmittance at the viewing angle at which the difference in the transmittance is not less than 0.1, specifically, a difference in transmittance in the vicinity of a Brewster's angle (particularly, the difference in the transmittance at a viewing angle at which the difference in the transmittance is maximized) is reduced to a difference in transmittance at which no colored light is recognized, specifically, less than 0.1 (i.e., less than 10%).

The following description will discuss, with reference to FIGS. 11 through 16, a method of forming an optimally-designed antireflection layer 28.

<Method of Forming Antireflection Layer 28 Made from Dielectric Material>

A method of forming an antireflection layer 28 made from a dielectric material will be described below.

FIG. 11 is a cross-sectional view schematically illustrating how reflected light is reduced by the antireflection layer 28 made from the dielectric material.

As has been described in Embodiment 1 above, it is important for a display device provided with a touch panel to prevent light entering in an oblique direction from reflecting so as to suppress rainbow unevenness caused due to a polarization effect of interface reflection.

A dielectric layer 41 is a layer designed so that reflected light is cancelled with use of interference of the reflected light. By forming the antireflection layer 28 with use of the dielectric material (by employing the dielectric layer 41 as the antireflection layer 28), it is possible to design the antireflection layer 28 in accordance with a viewing angle.

Particularly, the rainbow unevenness generated due to the polarization effect of the interface reflection by the display device provided with the touch panel is a phenomenon which starts to be recognized when a difference in transmittance is not less than 0.1 (as has been described in Embodiment 1). For example, in a case where a protection plate 26 is made of glass, it is preferable to design the dielectric layer 41 so that the dielectric layer 41 functions (i.e., the dielectric layer reduces reflection) at a viewing angle θ of not less than 48° on an interface between the glass and an air layer.

FIG. 11 shows a state where light which has entered at a viewing angle θ is prevented from being reflected by (i) an interface between the protection plate 26 and the dielectric layer 41 and (ii) the interface between the dielectric layer 41 and the air layer (air), thanks to a phase shift by half of a wavelength from a phase of interface reflection on the interface between the protection plate 26 and the dielectric layer 41 to a phase of interface reflection on the interface between the dielectric layer 41 and the air layer. The phase shift is made by determining a thickness of the dielectric layer 41 so that the phase shift is made. By designing the dielectric layer 41 as above, it is possible to reduce the interface reflection at the viewing angle θ.

Further, by forming the dielectric layer 41 to be a multilayer film, the antireflection layer 28 can prevent reflection of light of various wavelengths.

That is, it is possible to optically design the antireflection layer 28, by forming the dielectric layer 41 made of multiple layers so that the dielectric layer 41 eliminates reflected light with use of interference of the reflected light at a viewing angle θ at which rainbow unevenness easily occurs.

As such, it is possible to easily design the antireflection layer 28 in accordance with the viewing angle θ. Therefore, the antireflection layer 28 made from the dielectric material is more advantageous than an antireflection layer 28 having a minute structure, in terms of an antireflection effect and a design characteristic.

<Example Formation 1 of Antireflection Layer 28 Made from Dielectric Material>

FIG. 12 is a cross-sectional view illustrating an example of the antireflection layer 28 made from the dielectric material.

An antireflection layer 28 illustrated in FIG. 12 is configured so that a multilayer film of three dielectric layers 52 through 54 different in refractive index from one another is provided on a base material 51.

Examples of the antireflection layer 28 having the above configuration include an antireflection layer in which a poly(pentachlorophenyl methacrylate) film (refractive index: 1.61), a poly(pentabromophenyl methacrylate) film (refractive index: 1.70), and a poly(2,2,2-trifluoroethyl methacrylate) film (refractive index: 1.42) are stacked in this order as the respective dielectric layers 52 through 54 on the base material 51 made from a TAC film (refractive index: 1.49).

It is preferable to determine thicknesses of the respective layers (films) of the antireflection layer 28 so that the layers prevent, for example, blue light, green light, and red light from being reflected at a viewing angle θ at which rainbow unevenness easily occurs.

In this example, the poly(pentachlorophenyl methacrylate) film (dielectric layer 52), the poly(pentabromophenyl methacrylate) film (dielectric layer 53), and the poly(2,2,2-trifluoroethyl methacrylate) film (dielectric layer 54) were configured to have respective thicknesses of 95 nm, 103 nm, and 102 nm so that these films prevented respective beams of light having wavelengths of 450 nm, 550 nm, and 650 nm from being reflected at a viewing angle θ of 60°. Note that the TAC film (base material 51) was configured to be 100 μm in thickness.

By combining these films as the antireflection layer 28 with a protection plate 26 made of glass etc., it is possible to prevent light from being reflected on an interface with air. It is therefore possible to prevent transmitted light from being colored, and prevent rainbow unevenness.

Note that, in this example, the TAC film was employed as the base material 51. However, the base material 51 is not limited to the TAC film. For example, a PET film may be employed as the base material 51 instead.

<Example Formation 2 of Antireflection Layer 28 Made from Dielectric Material>

FIG. 13 is a cross-sectional view illustrating another example of the antireflection layer 28 made from the dielectric material.

An antireflection layer 28 illustrated in FIG. 13 is constituted by a multilayer film in which three dielectric layers 61 through 63 different in refractive index from one another are stacked. Note that the three dielectric layers 61 through 63 are directly stacked on a protection plate 26 (see FIG. 13).

In this example, for example, an $Al_2O_3$ film (refractive index: 1.64), a $ZrO_2$ film (refractive index: 2.00), and a $MgF_2$ film (refractive index: 1.38), which served as the antireflection layer 28, were stacked in this order on a protection plate 26 made of glass (refractive index: 1.50).

Note that, also in this example, thicknesses of the respective dielectric layers 61 through 63 were determined so that the dielectric layers 61 through 63 prevented respective beams of light having wavelengths of 450 nm, 550 nm, and 650 nm from being reflected at the viewing angle θ of 60°. Specifically, the $Al_2O_3$ film (dielectric layer 61), the $ZrO_2$ film (dielectric layer 62), and the $MgF_2$ film (dielectric layer 63) were configured to have the respective thicknesses of 95 nm, 105 nm, and 78 nm.

With this configuration, it is possible to prevent light from being reflected on an interface with air in this example too. It is therefore possible to prevent transmitted light from being colored, and prevent rainbow unevenness.

Note that it is possible to simultaneously stack the protection plate 26 and the antireflection layer 28 on a sensor film such as a double-side sensor film 30, for example, by (i) forming these dielectric layers 61 through 63 on a glass base material etc. employed as the protection plate 26 and then (ii) combining the glass base material with the sensor film via an adhesive layer 25.

Needless to say, these dielectric layers 61 through 63 may be formed sequentially on the protection plate 26 which is provided on the sensor film such as the double-side sensor film 30.

In any of the above cases, by directly stacking the dielectric layers on the protection plate 26 as described above, it is possible to reduce the number of components without necessity of another base material. It is further possible to easily form the antireflection layer 28 on a surface of a touch panel 20, i.e., on a surface of a sensor body 21 even in a case where a display device 1 is large in size, as compared with a case where an antireflection film is adhered onto a surface of the protection plate 26.

<Another Example Formation of Antireflection Layer 28 Made from Dielectric Material>

The above has described forming the antireflection layer 28 by stacking, on an upper surface of the protection plate 26 made of glass etc., the plurality of dielectric layers different in refractive index from one another (see, for example, FIG. 12 or FIG. 13). Alternatively, the antireflection layer 28 may be formed by alternately stacking a titanium oxide film and a silicon dioxide film which serve as the dielectric layers.

Note that, even in a case where the antireflection layer 28 is formed by alternately stacking the titanium oxide film and the silicon dioxide film, it is preferable to determine thicknesses of the titanium oxide film and the silicon dioxide film so that these films eliminate reflected light with use of interference of the reflected light at a viewing angle θ at which rainbow unevenness easily occurs.

The above has described a case where the three dielectric layers are stacked (see FIGS. 12 and 13). However, the number of dielectric layers to be stacked to constitute the antireflection layer 28 is not particularly limited. The number of dielectric layers to be stacked may be appropriately selected so that it is possible to prevent light having a desired wavelength from being reflected at a desired viewing angle θ.

<Method of Forming Antireflection Layer 28 Having Minute Convexoconcave Structure>

The following description will discuss a method of forming an antireflection layer 28 having a minute covexoconcave structure.

(a) of FIG. 14 and (b) of FIG. 14 are cross-sectional views each schematically illustrating a configuration of the antireflection layer 28 having the minute convexoconcave structure.

The antireflection layer 28 illustrated in each of (a) of FIG. 14 and (b) of FIG. 14 has the minute convexoconcave structure in which protrusions 71 are regularly arranged with a convexoconcave cycle of 100 nm.

The antireflection layer 28 having this minute convexoconcave structure has a refractive index which consecutively changes in a direction of a thickness of the antireflection layer 28. It is therefore possible to prevent light from being reflected on an interface with an air layer, by using the antireflection layer 28 having the minute convexoconcave structure.

However, the antireflection layer 28 having the minute convexoconcave structure tends to have an antireflection effect lower than that of the antireflection layer 28 made from the dielectric material. This is because light which enters, from an oblique direction, the antireflection layer 28 having the minute convexoconcave structure has a component which travels in a direction parallel to an in-plane direction more than a component which travels in the direction of the thickness of the antireflection layer 28 having the minute convexoconcave structure, though the antireflection layer 28 having the minute convexoconcave structure has a high reflectivity in a direction of a normal that is the direction of the thickness of the antireflection layer 28 having the minute convexoconcave structure.

It can therefore be said that the antireflection layer 28 made from the dielectric material is more advantageous than the antireflection layer 28 having the minute convexoconcave structure in terms of an antireflection effect and a design characteristic.

<Example Formation 1 of Antireflection Layer 28 Having Minute Convexoconcave Structure>

FIG. 15 is a cross-sectional view illustrating a formation example of the antireflection layer 28 having the minute convexoconcave structure.

FIG. 15 illustrates a case where the antireflection layer 28 having the minute convexoconcave structure is formed on a protection plate 26.

Examples of the antireflection layer 28 having the minute convexoconcave structure include a film having a minute structure in which minute protrusions 71 are arranged on a surface of the film. This film can be produced, for example, by (i) forming, by means of etching using a liquid chemical, aluminum anodization, etc., a metal mold having a minute structure whose pitch is approximately 100 nm and (ii) using the metal mold to transfer to a base material a minute structure made from a thermosetting resin or a photo-curable resin.

Examples of the base material include a TAC film. By combining the produced film with the protection plate 26, it is possible to form, on the protection plate 26, the antireflection layer 28 having a minute convexoconcave pattern whose cycle of convex and concave made by the protrusions 71 is controlled to be not more than a wavelength of visible light.

As such, the antireflection layer 28 has, on its surface, the minute convexoconcave structure having a size of not more than the wavelength of visible light. This allows the antireflection layer 28 to have a refractive index which gently changes and to prevent light from being reflected on an interface with an air layer (air) which interface has a polarization effect. It is therefore possible to prevent transmitted light from being colored, and prevent rainbow unevenness.

<Example Formation 2 of Antireflection Layer 28 Having Minute Convexoconcave Structure>

FIG. 16 is a cross-sectional view illustrating another example formation of the antireflection layer having the minute convexoconcave structure.

According to this example, protrusions 71 similar to those illustrated in FIG. 15 (minute convexoconcave structure) of an antireflection layer 28 are formed on a surface of a glass base material etc. by, e.g., (i) etching using a liquid chemical or (ii) directly processing glass with use of a metal mold.

As such, according to this example, the protrusions 71 are formed on a surface of a protection plate 26. The protection plate 26 on which surface the protrusions 71 are formed serves as an antireflection layer. In other words, the antireflection layer 28 having the minute convexoconcave structure also serves as a protection layer.

By adhering the antireflection layer 28 having the minute convexoconcave structure onto a sensor film such as a double-side sensor film 30 via an adhesive layer 25, it is possible to form, on the sensor film, the antireflection layer 28 which serves as the antireflection layer and the protection layer.

As such, also in this example, a surface of the antireflection layer 28, i.e., an interface between a touch panel 20 and an air layer (air) has the minute convexoconcave structure having a size of not more than the wavelength of visible light. This allows the antireflection layer 28 to have a refractive index which gently changes and to prevent light from being reflected on the interface with the air layer (air) which interface has the polarization effect. It is therefore possible to prevent transmitted light from being colored, and prevent rainbow unevenness.

Further, since the protection plate 26 also serves as the antireflection layer 28, it is possible to reduce the number of components. It is further possible to easily form the antireflection layer 28 on a surface of the touch panel 20, i.e., on a surface of a sensor body 21 even in a case where a display device 1 is large in size, as compared with a case where an antireflection film is adhered onto the surface of the protection plate 26.

Note that FIG. 1 illustrates a case where the sensor body 21 has a touch sensor structure in which the double-side sensor film 30 is employed as a sensor film. However, the present embodiment is not limited to this.

The following description will discuss, with reference to (a) through (f) of FIG. 17 through (a) through (f) of FIG. 22, (i) a modified example of the touch sensor structure of the sensor body 21 and (ii) a method of forming a modified touch sensor structure.

Note that a difference from the method illustrated in (a) through (f) of FIG. 3 will be described below.

<Modified Example 1 of Touch Sensor Structure>

(a) of FIG. 17 through (f) of FIG. 17 are cross-sectional views illustrating, in order of step, a method of producing a sensor body 21 of a touch panel 20. Note that (a) of FIG. 17 through (f) of FIG. 17 do not illustrate a Y electrode pattern 32, an X electrode pattern 33, and drawing wirings 36 and 39.

The sensor body 21 of Modified Example 1 is configured so that (i) a single-side sensor film 81 in which a Y electrode pattern 32 (not illustrated) is provided on one surface of a first birefringent base material 31, (ii) an adhesive layer 82, and (iii) a single-side sensor film 83 in which an X electrode pattern 33 (not illustrated) is provided on one surface of a second birefringent base material 31 are stacked in this order from below (see (f) of FIG. 17). The sensor body 21 includes the single-side sensor film 81, the adhesive layer 82, and the single-side sensor film 83, instead of the protection film 23, the adhesive layer 24, and the double-side sensor film 30 which are illustrated in (f) of FIG. 3.

The sensor body 21 having the above configuration is produced, for example, as follows.

First, similar to (a) of FIG. 3, the Y electrode pattern 32 (not illustrated) is formed on the one surface of the first birefringent base material 31, so that the single-side sensor film 81 including the Y electrode pattern 32 is formed (see (a) of FIG. 17).

Subsequently, the adhesive layer 82 such as an OCAT is formed on a sensor surface 81a of the single-side sensor film 81 (i.e., a surface of the single-side sensor film 81 on which surface the Y electrode pattern 32 is formed) so that the sensor surface 81a serves as an upper surface of the single-side sensor film 81 (see (b) of FIG. 17).

On the other hand, similar to (a) of FIG. 3, the X electrode pattern 33 (not illustrated) is formed on the one surface of the second birefringent base material 31, so that the single-side sensor film 83 including the X electrode pattern 33 is formed (see (c) of FIG. 17).

Thereafter, the single-side sensor film 81 and the single-side sensor film 83 are combined with each other via the adhesive layer 82 so that (i) a sensor surface 83a of the single-side sensor film 83 (i.e., a surface of the single-side sensor film 83 on which surface the X electrode pattern 33 is formed) serves as an upper surface of the single-side sensor film 83 (see (c) of FIG. 17) and (ii), similar to the double-side sensor film 30, when viewed from above, each Y electrode 34 (not illustrated) is located between corresponding two adjacent X electrodes 37, and each X electrode 37 (not illustrated) is located between corresponding two adjacent Y electrodes 34.

Subsequently, an adhesive layer 25 such as an OCAT is formed on the sensor surface 83a of the single-side sensor film 83 (see (d) of FIG. 17). Then, a protection plate 26 is adhered via the adhesive layer 25 to the sensor surface 83a of the single-side sensor film 83 (see (e) of FIG. 17).

Finally, similar to (f) of FIG. 3, an antireflection layer 28 is formed so that a surface of the antireflection layer 28 is a top surface of the touch panel 20 (a top surface of the sensor body 21; in Modified Example 1, on an upper surface of the protection plate 26) (see (f) of FIG. 17). Note that (f) of FIG. 17 illustrates a case where, similar to (f) of FIG. 3, the antireflection layer 28 is formed on the protection plate 26 via an adhesive layer 27. However, a method of forming the antireflection layer 28 is not limited to this case. The above-described various modifications of the method can be employed instead.

<Modified Example 2 of Touch Sensor Structure>

(a) of FIG. 18 through (h) of FIG. 18 are cross-sectional views illustrating, in order of step, a method of producing a sensor body 21 of a touch panel 20. Note that (a) of FIG. 18 through (h) of FIG. 18 do not illustrate a Y electrode pattern 32, an X electrode pattern 33, and drawing wirings 36 and 39, either.

The sensor body 21 of Modified Example 2 is configured to include, instead of the double-side sensor film 30 illustrated in (f) of FIG. 3, (i) a single-side sensor film 81 including a Y electrode pattern 32 (not illustrated), (ii) an adhesive layer 82, and (iii) a single-side sensor film 83 including an X electrode pattern 33 (not illustrated). The single-side sensor film 81, the adhesive layer 82, and the single-side sensor film 83 are stacked in this order from below so that (i) a sensor surface 81a of the single-side sensor film 81 serves as a lower surface of the single-side sensor film 81 and (ii) a sensor surface 83a of the single-side sensor film 83 serves as a lower surface of the single-side sensor film 83 (see (h) of FIG. 18).

The sensor body 21 having the above configuration is produced, for example, as follows.

First, similar to (a) of FIG. 3, the X electrode pattern 33 (not illustrated) is formed on one surface of a first birefringent base material 31, so that the single-side sensor film 83 including the X electrode pattern 33 is formed (see (a) of FIG. 18).

Subsequently, the adhesive layer 82 such as an OCAT is formed on the sensor surface 83a which serves as the lower surface of the single-side sensor film 83 (see (b) of FIG. 18).

On the other hand, similar to (a) of FIG. 3, the Y electrode pattern 32 (not illustrated) is formed on one surface of a second birefringent base material 31, so that the single-side sensor film 81 including the Y electrode pattern 32 is formed (see (c) of FIG. 18).

Thereafter, the single-side sensor film 83 and the single-side sensor film 81 are combined with each other via the adhesive layer 82 so that (i) the sensor surface 81a of the single-side sensor film 81 serves as the lower surface of the single-side sensor film 81 (see (c) of FIG. 18) and (ii), similar to the double-side sensor film 30, when viewed from above, each Y electrode 34 (not illustrated) is located between corresponding two adjacent X electrodes 37, and each X electrode 37 (not illustrated) is located between corresponding two adjacent Y electrodes 34.

Subsequently, an adhesive layer 24 such as an OCAT is formed on the sensor surface 81a of the single-side sensor film 81 (see (d) of FIG. 18). Then, a protection film 23 is adhered via the adhesive layer 24 to the sensor surface 81a of the single-side sensor film 81 (see (e) of FIG. 18).

Thereafter, an adhesive layer 25 such as an OCAT is formed on an upper surface side of the single-side sensor film 83 provided on an upper surface side of the sensor body 21, i.e., above the sensor surface 83a of the single-side sensor film 83 (see (f) of FIG. 18). Then, a protection plate 26 is adhered via the adhesive layer 25 above the sensor surface 83a of the single-side sensor film 83 (see (g) of FIG. 18).

Finally, similar to (f) of FIG. 3, an antireflection layer 28 is formed via an adhesive layer 27 etc. so that a surface of the antireflection layer 28 is a top surface of the touch panel 20 (a top surface of the sensor body 21; in Modified Example 2, on an upper surface of the protection plate 26) (see (h) of FIG. 18). Note that, also in Modified Example 2, a method of forming the antireflection layer 28 is not limited to this. The above-described various modifications of the method can be employed instead.

<Modified Example 3 of Touch Sensor Structure>

(a) of FIG. 19 through (f) of FIG. 19 are cross-sectional views illustrating, in order of step, a method of producing a sensor body 21 of a touch panel 20. Note that (a) of FIG. 19 through (f) of FIG. 19 do not illustrate a Y electrode pattern 32, an X electrode pattern 33, and drawing wirings 36 and 39, either. FIG. 20 is a plain view illustrating pattern shapes of the Y electrode pattern 32 and the X electrode pattern 33 included in a single-side sensor film 83.

The sensor body 21 of Modified Example 3 is configured to include, instead of the double-side sensor film 30 illustrated in (f) of FIG. 3, a single-side sensor film 84 having one surface on which the Y electrode pattern 32 (not illustrated) and the X electrode pattern 33 (not illustrated) are provided so that a sensor surface 84a of the single-side sensor film 84 (i.e., a surface of the single-side sensor film 84 on which surface the Y electrode pattern 32 and the X electrode pattern 33 are formed) serves as a lower surface of the single-side sensor film 84 (see (f) of FIG. 19), the single-side sensor film 84 being provided in an order illustrated in (f) of FIG. 19.

The sensor body 21 having the above configuration is produced, for example, as follows.

First, Y electrodes 34 and X electrodes 37 are arranged on one surface of a birefringent base material 31 so that (i) each of the Y electrodes 34 is located between corresponding two adjacent ones of the X electrodes 37 and (ii) each of the X electrodes 37 is located between corresponding two adjacent ones of the Y electrodes 34 (see FIG. 20), so that the single-side sensor film 84 having the one surface on which the Y electrode pattern 32 and the X electrode pattern 33 are provided is formed (see (a) of FIG. 19).

In a case where the Y electrode pattern 32 and the X electrode pattern 33 are provided on the one surface of the single-side sensor film 84, a space 85 is formed between the Y electrodes 34 and the X electrodes 37 (see FIG. 20) so that these Y electrodes 34 and X electrodes 37 are not electrically connected to each other.

Note that FIG. 20 illustrates a case where each connection line 34a serving as a jumper makes a bridge connection between corresponding two Y electrodes 34 of a Y electrode column 35 so as to cross a corresponding connection line 37a which connects two X electrodes 37 of an X electrode row 38. Alternatively, each connection line 37a may have a jumper structure in which the each connection line 37a makes a bridge connection between corresponding two X electrodes 37 so as to cross a corresponding connection line 34a. As such, the jumper etc. makes a bridge connection between ones of the Y electrodes 34 and the X electrodes 37 so as to cross a direction in which the others of the Y electrodes 34 and the X electrodes 37 are arranged. This makes it possible to form the Y electrode pattern 32 and the X electrode pattern 33 in a same flat surface without electrically connecting the Y electrodes 34 and the X electrodes.

Note that, in this case, it is preferable to provide an electrically-insulating layer between the each connection line 34a and the corresponding connection line 37a (i.e., when viewed from above, between the each connection line 34a and the corresponding connection line 37a in a part where the each connection line 34a and the corresponding connection line 37a intersect with each other). A material for the electrically-insulating layer is not particularly limited. Publicly-known various electrically-insulating materials can be employed as the material for the electrically-insulating layer.

An electrically-insulating layer does not need to be provided in the space 85. The space 85 may be filled with an adhesive layer 24, depending on a material for the adhesive layer 24 or a method of forming the adhesive layer 24.

Note that a size of the space 85 (i.e., a distance between the Y electrodes 34 and the X electrodes 37) is not particularly limited provided that the space 85 can keep electrical insulation between the Y electrodes 34 and the X electrodes 37.

As illustrated in (b) of FIG. 19, the adhesive layer 24 such as an OCAT is formed on the sensor surface 84a which serves as the lower surface of the single-side sensor film 84. Then, a protection film 23 is adhered via the adhesive layer 24 to the sensor surface 84a of the single-side sensor film 84 (see (c) of FIG. 19).

Subsequently, an adhesive layer 25 such as an OCAT is formed on an upper surface side of the single-side sensor film 84, i.e., on a surface of the single-side sensor film 84 which surface is opposite to the sensor surface 84a (see (d) of FIG. 19). Then, a protection plate 26 is adhered via the adhesive layer 25 to the upper surface side of the single-side sensor film 84 (see (e) of FIG. 19).

Finally, similar to (f) of FIG. 3, an antireflection layer 28 is formed via an adhesive layer 27 etc. so that a surface of the antireflection layer 28 is a top surface of the touch panel 20 (a top surface of the sensor body 21; in Modified Example 3, on an upper surface of the protection plate 26) (see (f) of FIG. 19). Note that, also in Modified Example 3, a method of forming the antireflection layer 28 is not limited to this. The above-described various modifications of the method can be employed instead.

<Modified Example 4 of Touch Sensor Structure>

(a) of FIG. 21 through (d) of FIG. 21 are cross-sectional views illustrating, in order of step, a method of producing a sensor body 21 of a touch panel 20. Note that (a) of FIG. 21 through (d) of FIG. 21 do not illustrate a Y electrode pattern 32, an X electrode pattern 33, and drawing wirings 36 and 39, either.

The sensor body 21 of Modified Example 4 is configured to include (i) a single-side sensor film 84 having one surface on which a Y electrode pattern 32 (not illustrated) and an X electrode pattern 33 (not illustrated) are provided, (ii) an adhesive layer 25, and (iii) a protection plate 26 in this order from below so that a sensor surface 84a of the single-side sensor film 84 serves as an upper surface of the single-side sensor film 84 (see (d) of FIG. 21). Since the single-side sensor film 84 is provided so that the sensor surface 84a of the single-side sensor film 84 serves as the upper surface of the single-side sensor film 84, the sensor body 21 does not include an adhesive layer 24 and a protection film 23.

The sensor body 21 having the above configuration is produced, for example, as follows.

First, similar to (a) of FIG. 19, the single-side sensor film 84, having the one surface on which the Y electrode pattern 32 and the X electrode pattern 33 are provided, is formed (see (a) of FIG. 21).

Subsequently, the adhesive layer 25 such as an OCAT is formed on the sensor surface 84a which serves as the upper surface of the single-side sensor film 84 (see (b) of FIG. 21). Then, the protection plate 26 is adhered via the adhesive layer 25 to the upper surface of the single-side sensor film 84 (see (c) of FIG. 21).

Finally, similar to (f) of FIG. 3, an antireflection layer 28 is formed via an adhesive layer 27 etc. so that a surface of the antireflection layer 28 is a top surface of the touch panel 20 (a top surface of the sensor body 21; in Modified Example 4, on an upper surface of the protection plate 26) (see (d) of FIG. 21). Note that, also in Modified Example 4, a method of forming the antireflection layer 28 is not limited to this. The above-described various modifications of the method can be employed instead.

<Modified Example 5 of Touch Sensor Structure>

(a) of FIG. 22 through (f) of FIG. 22 are cross-sectional views illustrating, in order of step, a method of producing a sensor body 21 of a touch panel 20. Note that (a) of FIG. 22 through (f) of FIG. 22 do not illustrate a Y electrode pattern 32, an X electrode pattern 33, and drawing wirings 36 and 39, either.

Unlike the sensor body 21 illustrated in (h) of FIG. 18, the sensor body 21 of Modified Example 5 is configured so that (i) neither an adhesive layer 25 nor a protection plate 26 is provided on an upper surface side of a single-side sensor film 83 and (ii) an antireflection layer 28 is formed on the upper surface side via an adhesive layer 27 (see (f) of FIG. 22).

Steps illustrated in (a) of FIG. 22 through (e) of FIG. 22 are identical to those illustrated in (a) of FIG. 18 through (e) of FIG. 18.

According to the sensor body 21 of Modified Example 5, a protection film 23 is adhered via an adhesive layer 24 to a sensor surface 81a of a single-side sensor film 81 (see (e) of FIG. 18). Then, similar to (f) of FIG. 3, the antireflection layer 28 is formed via the adhesive layer 27 etc. so that a surface of the antireflection layer 28 is a top surface of the touch panel 20 (a top surface of the sensor body 21; in Modified Example 5, on the upper surface of the single-side sensor film 83) (see (f) of FIG. 18). Note that, also in Modified Example 5, a method of forming the antireflection layer 28 is not limited to this. The above-described various modifications of the method can be employed instead.

The touch panel 20 (sensor body 21) of the present embodiment may be configured to include a plurality of birefringent base materials 31.

<Modified Example of Main Body 10 of Display Device>

The present embodiment has described a case where a liquid crystal display device is employed as a main body 10 of a display device which main body 10 emits polarized light. However, the present embodiment is not limited to this case. Various display devices including a polarization plate (polarizer) can be employed as the main body 10. Examples of the display devices include a display device in which a dielectric liquid is employed as a display medium though the liquid crystal display device employs liquid crystal as the display medium.

<Modified Example of Detection Method of Touch Panel 20>

The present embodiment has described a case where an electrostatic capacitive touch panel is employed as a touch panel 20. However, a detection method itself of the touch panel 20 is not particularly limited. The present embodiment is applicable to a touch panel in general having a display region where a birefringent base material is employed as a base material.

<Modified Example of Touch Sensor Structure of Double-Side Sensor Film 30 etc.>

The present embodiment has described a case where a double-side sensor film 30 is configured so that (i) a Y electrode pattern 32 is provided on a lower surface side of a birefringent base material 31 and (ii) an X electrode pattern 33 is provided on an upper surface side of the birefringent base material 31. Alternatively, the double-side sensor film 30 may be configured so that the Y electrode pattern 32 is provided on the upper surface side of the birefringent base material 31, whereas the X electrode pattern 33 is provided on the lower surface side of the birefringent base material 31.

Similarly, the Y electrode pattern 32 and the X electrode pattern 33 may be stacked in an opposite order in the above-described other modified examples of the touch sensor structure too.

<Modified Example of Protection Layer>

The present embodiment has described a case where, for example, a plastic film or plastic substrate, and a glass substrate are combined with a double-side sensor film 30 etc. via adhesive layers 25 and 32, so that protection layers (a protection film 23 and a protection plate 26) are adhered to the double-side sensor film 30.

However, the present embodiment is not limited to this case. It is possible to form the protection layers on the double-side sensor film 30, for example, by (i) laminating a plastic film on the double-side sensor film 30 or (ii) applying a material for the protection layers onto the double-side sensor film 30.

That is, these protection layers may be integrated with the double-side sensor film 30 by combining these protection layers with the double-side sensor film 30 via adhesive layers. Alternatively, these protection layers may be integrated with the double-side sensor film 30 by directly stacking these protection layers on the double-side sensor film 30.

SUMMARY

A display device of Aspect 1 of the present invention is configured to be a display device, including: a display panel including a polarizing plate on a surface of the display panel; and a touch panel including a birefringent base material on which electrodes for detecting a touch position of a position detecting object are provided, polarized light which has exited from the polarizing plate entering the birefringent base material, and the touch panel having a first surface on which an antireflection layer which reduces reflection of the polarized light is provided, the first surface being opposite to a second surface of the touch panel which second surface faces the display panel.

It is preferable to configure the display device of Aspect 1 of the present invention to be a display device of Aspect 2 of the present invention in which the antireflection layer reduces reflection of the polarized light which is reflected on the first surface toward the display panel at a viewing angle at which a difference in transmittance between an s-wave and a p-wave is not less than 10%.

As has been described, the inventors of the present invention found that, in a case where a touch panel including a birefringent base material is provided on a display device, such as a liquid crystal panel, from which polarized light exits, rainbow unevenness (rainbow-like color band) is visually recognized by a viewer without polarized glasses on at a certain viewing angle, particularly at a viewing angle at which a difference in transmittance between an s-wave and a p-wave on an interface of the touch panel which interface has a polarization effect is not less than 10%.

As a result of a further study, the inventors of the present invention found that such rainbow unevenness is caused due to (i) a change in polarization state that differs from one wavelength to another, the change being caused due to the birefringent base material, and (ii) a dependency, on the polarization state, of interface reflection on an interface between an air layer and a surface of the touch panel, e.g., a cover glass. The inventors of the present invention found that, specifically, a phase shift of linearly-polarized light due to a birefringent property of the birefringent base material, and the polarization effect generate the rainbow unevenness.

As such, the interface reflection brings about the polarization effect which causes the rainbow unevenness, It is therefore possible to prevent the rainbow unevenness by suppressing the polarization effect brought about by the interface reflection.

Particularly, in a case of a display device provided with no antireflection layer, interface reflection occurs most remarkably on an interface with an air layer which interface has a great difference in refractive index, e.g., on an interface between the air layer and a protection plate such as a cover glass.

It is therefore possible to prevent rainbow unevenness by preventing interface reflection on an interface between a touch panel and the air layer (e.g., interface reflection on the interface between the air layer and the protection plate such as the cover glass).

It is possible to prevent transmitted light from being colored, and to reduce rainbow unevenness to be visually recognized at the viewing angle, by providing the antireflection layer on an interface between the display device and air, i.e., on the first surface of the touch panel which first surface is opposite to the second surface of the touch panel which second surface faces the display panel (e.g., a top surface of the touch panel, i.e., an upper surface of the protection plate) so as to reduce reflection of not external light but light which has exited from the display panel and has passed through the birefringent base material (as has been described).

It is preferable to configure the display device of Aspect 1 or 2 of the present invention to be a display device of Aspect 3 of the present invention which has a 15-inch or larger display surface.

In a case where the display device which includes the touch panel and has a 15-inch display surface (display size) is horizontally placed, e.g., placed on a desk, and is observed from an oblique direction at a viewing distance of 40 cm and a central viewing angle of 30°, a viewing angle at an edge of the display surface is approximately 48° at which (i) colored transmitted light starts to be recognized and (ii) a difference in transmittance is approximately 10%.

Therefore, an observer who observes the display device having the 15-inch or larger display surface constantly recognizes rainbow unevenness.

The present invention is particularly effective in a case where a display device has a 15-inch or larger display surface.

It is preferable to configure the display device of any one of Aspects 1 through 3 of the present invention to be a display device of Aspect 4 of the present invention in which the antireflection layer includes a multilayer film in which a plurality of dielectric layers different in refractive index from each other are stacked so that a surface of the multilayer film is the first surface.

The plurality of dielectric layers are designed so that reflected light is cancelled with use of interference of the reflected light. By configuring the antireflection layer to include the plurality of dielectric layers as described above, it is possible to design the antireflection layer in accordance with a viewing angle.

Further, by including the multilayer film in which the plurality of dielectric layers are stacked, the antireflection layer can prevent reflection of light of various wavelengths.

That is, by stacking the plurality of dielectric layers so that reflected light is cancelled with use of interference of the reflected light at a viewing angle at which rainbow unevenness easily occurs, it is possible to optically design the antireflection layer.

It is therefore preferable, in terms of (i) ease of designing in accordance with a viewing angle, (ii) a great antireflection effect, and (iii) an excellent design characteristic, that the antireflection layer includes the multilayer film in which the plurality of dielectric layers different in refractive index from each other are stacked so that the surface of the multilayer film is the first surface.

Note that the antireflection layer may be an antireflection film including a base material. The antireflection layer may be configured so that the plurality of dielectric layers are directly stacked on a surface of a protection plate which is provided between the birefringent base material and the antireflection layer, the protection plate protecting the birefringent base material on which the electrode is provided.

That is, the display device of Aspect 4 of the present invention may be configured to be a display device of Aspect 5 of the present invention in which a protection plate which protects the birefringent base material on which the electrodes are provided is provided between the birefringent base material and the antireflection layer, and the plurality of dielectric layers are directly stacked on a surface of the protection plate.

According to this configuration, it is possible to reduce the number of components without necessity of another base material. It is further possible to easily form the antireflection layer on a surface of the touch panel even in a case where the display device is large in size, as compared with a case where the antireflection film is adhered onto the surface of the protection plate.

It is preferable to configure the display device of Aspect 5 of the present invention to be a display device of Aspect 6 of the present invention in which a phase of interface reflection on an interface between the protection layer and the plurality of dielectric layers is shifted by half of a wavelength from a phase of interface reflection on an interface between the plurality of dielectric layers and an air layer.

This configuration makes it possible to reduce interface reflection at a viewing angle at which a difference in transmittance between an s-wave and a p-wave is not less than 10%. It is therefore possible to reduce the rainbow unevenness.

The display device of any one of Aspects 1 through 3 of the present invention may be configured to be a display device of Aspect 7 of the present invention in which a surface of the antireflection layer has a minute convexoconcave structure having (i) a size of not more than a wavelength of visible light and (ii) a refractive index which consecutively changes in a direction of a thickness of the antireflection layer.

The antireflection layer having the minute convexoconcave structure can prevent reflection of light on an interface with the air layer. It is therefore possible, also in this case, to reduce the rainbow unevenness.

The display device of Aspect 7 of the present invention may be configured to be a display device of Aspect 8 of the present invention in which the display device of Aspect 8 includes a protection plate which protects the birefringent base material on which the electrodes are provided, and a surface of the protection plate has the minute convexoconcave structure which serves as the antireflection layer.

According to the configuration, the protection plate also serves as the antireflection layer (in other words, the antireflection layer also serves as the protection plate). It is therefore possible to reduce the number of components. It is further possible to easily form the antireflection layer on the surface of the touch panel even in a case where the display device is large in size, as compared with the case where the antireflection film is adhered onto the surface of the protection plate.

Further, it is preferable to configure the display device so that the polarized light which has exited from the polarizing plate directly enters the birefringent base material without passing through a ¼ wavelength plate etc., unlike Patent Literatures 1 and 2.

That is, it is preferable to configure the display device of any one of Aspects 1 through 8 of the present invention to be a display device of Aspect 9 of the present invention in which the polarized light which has exited from the polarizing plate directly enters the birefringent base material.

It is preferable to configure the display device of any one of Aspects 1 through 9 of the present invention to be a display device of Aspect 10 of the present invention in which the antireflection layer reduces reflection of the polarized light which is reflected on the first surface of the touch panel toward the display panel at a(the) viewing angle at which a difference in transmittance between an s-wave and a p-wave is not less than 10%, specifically, reflection of the polarized light which is reflected on the interface between the surface of the touch panel and the air layer in the vicinity of a Brewster's angle, so that the difference is less than 10%.

It is possible to prevent rainbow unevenness from being recognized, by providing, on the first surface of the touch panel which first surface is opposite to the second surface of the touch panel which second surface faces the display panel, the antireflection layer which reduces the reflection of the polarized light which is reflected on the first surface of the touch panel at the viewing angle so that the difference is less than 10%.

It is preferable to configure the display device of any one of Aspects 1 through 10 of the present invention to be a display device of Aspect 11 of the present invention in which the birefringent base material is made from polyethylene terephthalate, in terms of cost, heat resistance, etc.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is applicable to a display device provided with a touch panel that includes a birefringent base material which touch panel polarized light enters, the polarized light having exited from a display panel (e.g., a liquid crystal panel) that includes a polarizing plate on a surface of the display panel.

REFERENCE SIGNS LIST

1: Display device
10: Main body of display device
11: Backlight
12: Display panel
13, 14: Substrate
15: Optical modulation layer
16: Display cell
17, 18: Polarizing plate
20: Touch panel
21: Sensor body
22: Circuit section
23: Protection film
24, 25: Adhesive layer
26: Protection plate
27: Adhesive layer
28: Antireflection layer
30: Double-side sensor film
31: Birefringent base material
32: Y electrode pattern
33: X electrode pattern
34: Y electrode
34a: Connection line
35: Y electrode column
36: Drawing wiring
37: X electrode
37a: Connection line
38: X electrode row
39: Drawing wiring
41: Dielectric layer
51: Base material
52 through 54: Dielectric layer
61 through 63: Dielectric layer
71: Protrusion
81: Single-side sensor film
81a: Sensor surface
82: Adhesive layer
83: Single-side sensor film
83a: Sensor surface
84: Single-side sensor film
84a: Sensor surface
85: Space
101: Polarizing plate
102: Birefringent film base material
103: Polarizing plate

The invention claimed is:
1. A display device, comprising:
a display panel including a polarizing plate on a surface of the display panel; and
a touch panel including a birefringent base material on which electrodes that detect a touch position of a position detecting object are provided, wherein polarized light which has exited from the polarizing plate enters the birefringent base material, the touch panel includes a first surface on which an antireflection layer which reduces reflection of the polarized light is provided, the first surface being opposite to a second surface of the touch panel which second surface faces the display panel, the antireflection layer includes a multilayer film in which a plurality of dielectric layers different in refractive index from each other are stacked so that a surface of the multilayer film is the first surface, a protection plate which protects the birefringent base material on which the electrodes are provided is provided between the birefringent base material and the antireflection layer, the plurality of dielectric layers are directly stacked on a surface of the protection plate, and a phase of interface reflection on an interface between the protection plate and the plurality of dielectric layers is shifted by half of a wavelength from a phase of interface reflection on an interface between the plurality of dielectric layers and an air layer.

2. The display device as set forth in claim 1, wherein the antireflection layer reduces reflection of the polarized light which is reflected on the first surface toward the display panel at a viewing angle at which a difference in transmittance between an s-wave and a p-wave is not less than 10%.

3. The display device as set forth in claim 1, having a 15-inch or larger display surface.

4. The display device as set forth in claim 1, wherein
a surface of the protection plate has a minute convexo-concave structure which serves as the antireflection and has (i) a size of not more than a wavelength of visible light and (ii) a refractive index which consecutively changes in a direction of a thickness of the antireflection layer.

5. The display device as set forth in claim 1, wherein the polarized light which has exited from the polarizing plate directly enters the birefringent base material.

6. The display device as set forth in claim 1, wherein the antireflection layer reduces reflection of the polarized light which is reflected on the first surface of the touch panel toward the display panel at a viewing angle at which a difference in transmittance between an s-wave and a p-wave is not less than 10% so that the difference is less than 10%.

7. The display device as set forth in claim 1, wherein the birefringent base material is made from polyethylene terephthalate.

8. A display device, comprising:
a display panel including a polarizing plate on a surface of the display panel; and
a touch panel including a birefringent base material on which electrodes that detect a touch position of a position detecting object are provided, wherein
polarized light which has exited from the polarizing plate enters the birefringent base material, the touch panel includes a first surface on which an antireflection layer which reduces reflection of the polarized light is provided, the first surface being opposite to a second surface of the touch panel which second surface faces the display panel, and a surface of the antireflection layer has a minute convexo-concave structure having (i) a size of not more than a wavelength of visible light and (ii) a refractive index which consecutively changes in a direction of a thickness of the antireflection layer.

9. The display device as set forth in claim 8, wherein the antireflection layer reduces reflection of the polarized light which is reflected on the first surface toward the display panel at a viewing angle at which a difference in transmittance between an s-wave and a p-wave is not less than 10%.

10. The display device as set forth in claim 8, having a 15-inch or larger display surface.

11. The display device as set forth in claim 8, wherein the antireflection layer includes a multilayer film in which a plurality of dielectric layers different in refractive index from each other are stacked so that a surface of the multilayer film is the first surface.

12. The display device as set forth in claim 11, wherein a protection plate which protects the birefringent base material on which the electrodes are provided is provided between the birefringent base material and the antireflection layer, and
the plurality of dielectric layers are directly stacked on a surface of the protection plate.

13. The display device as set forth in claim 12, wherein a phase of interface reflection on an interface between the protection plate and the plurality of dielectric layers is shifted by half of a wavelength from a phase of interface reflection on an interface between the plurality of dielectric layers and an air layer.

14. The display device as set forth in claim 8, wherein the display device includes a protection plate which protects the birefringent base material on which the electrodes are provided, and
a surface of the protection plate has the minute convexo-concave structure which serves as the antireflection layer.

15. The display device as set forth in claim 8, wherein the polarized light which has exited from the polarizing plate directly enters the birefringent base material.

16. The display device as set forth in claim 8, wherein the antireflection layer reduces reflection of the polarized light which is reflected on the first surface of the touch panel toward the display panel at a viewing angle at which a difference in transmittance between an s-wave and a p-wave is not less than 10% so that the difference in transmittance is less than 10%.

17. The display device as set forth in claim 8, wherein the birefringent base material is made from polyethylene terephthalate.

* * * * *